July 5, 1966   C. F. H. CRATHERN III, ETAL   3,259,030
FABRICATION OF BOX PARTS FROM PLASTIC MATERIAL
Filed March 21, 1963   15 Sheets-Sheet 1
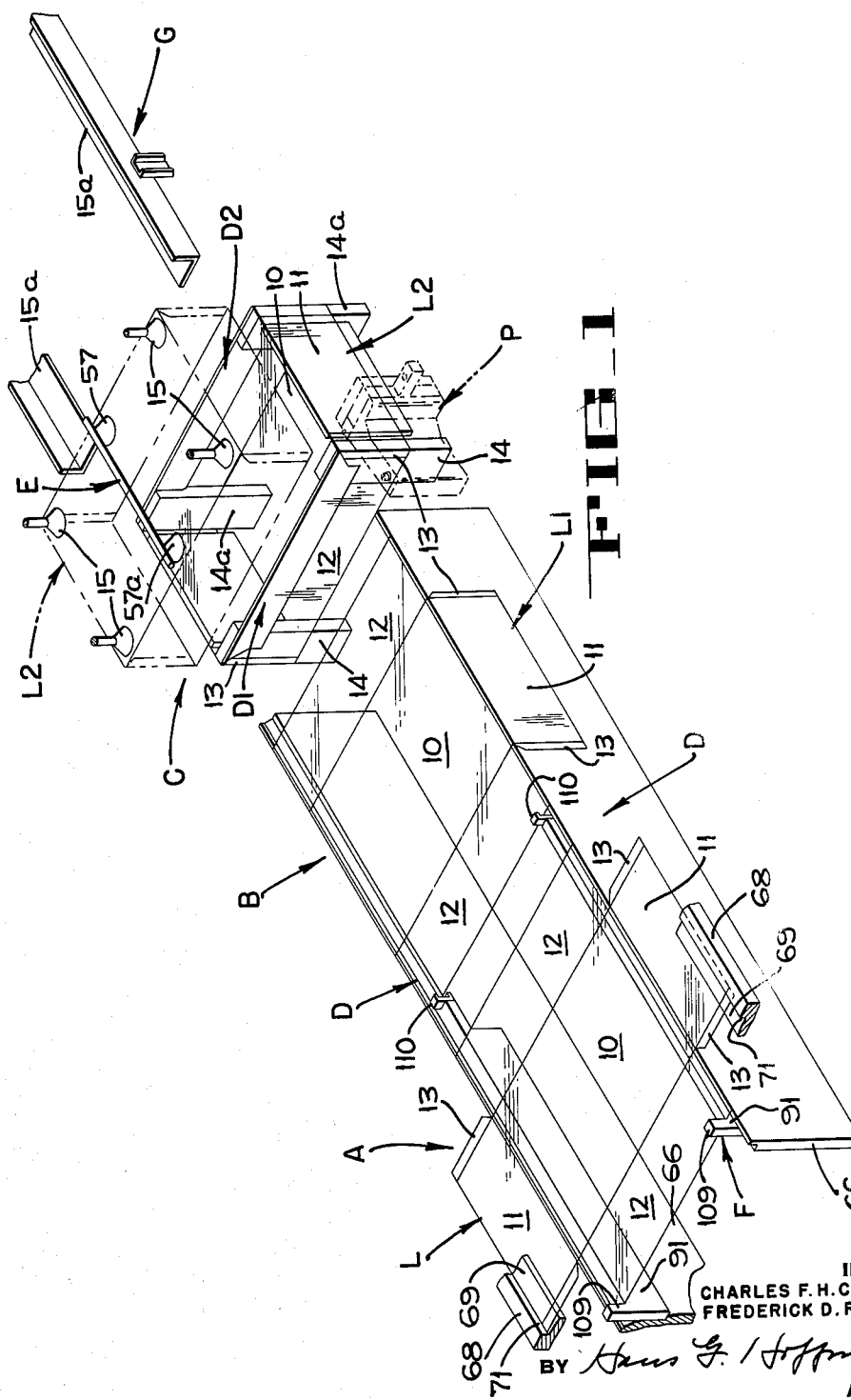
INVENTORS
CHARLES F. H. CRATHERN, III
FREDERICK D. ROBERTS
BY Hans G. Hoffmeister
ATTORNEY

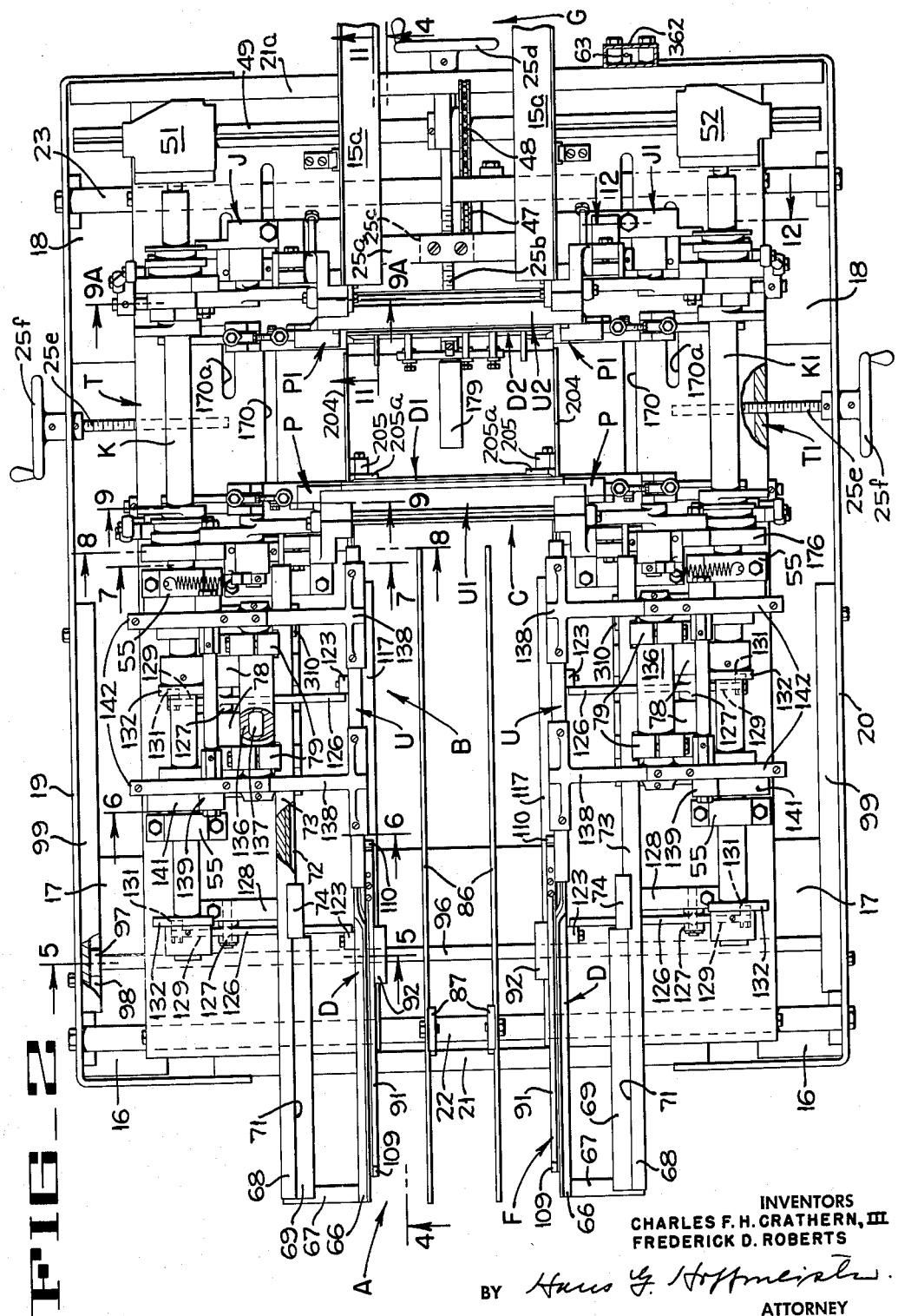

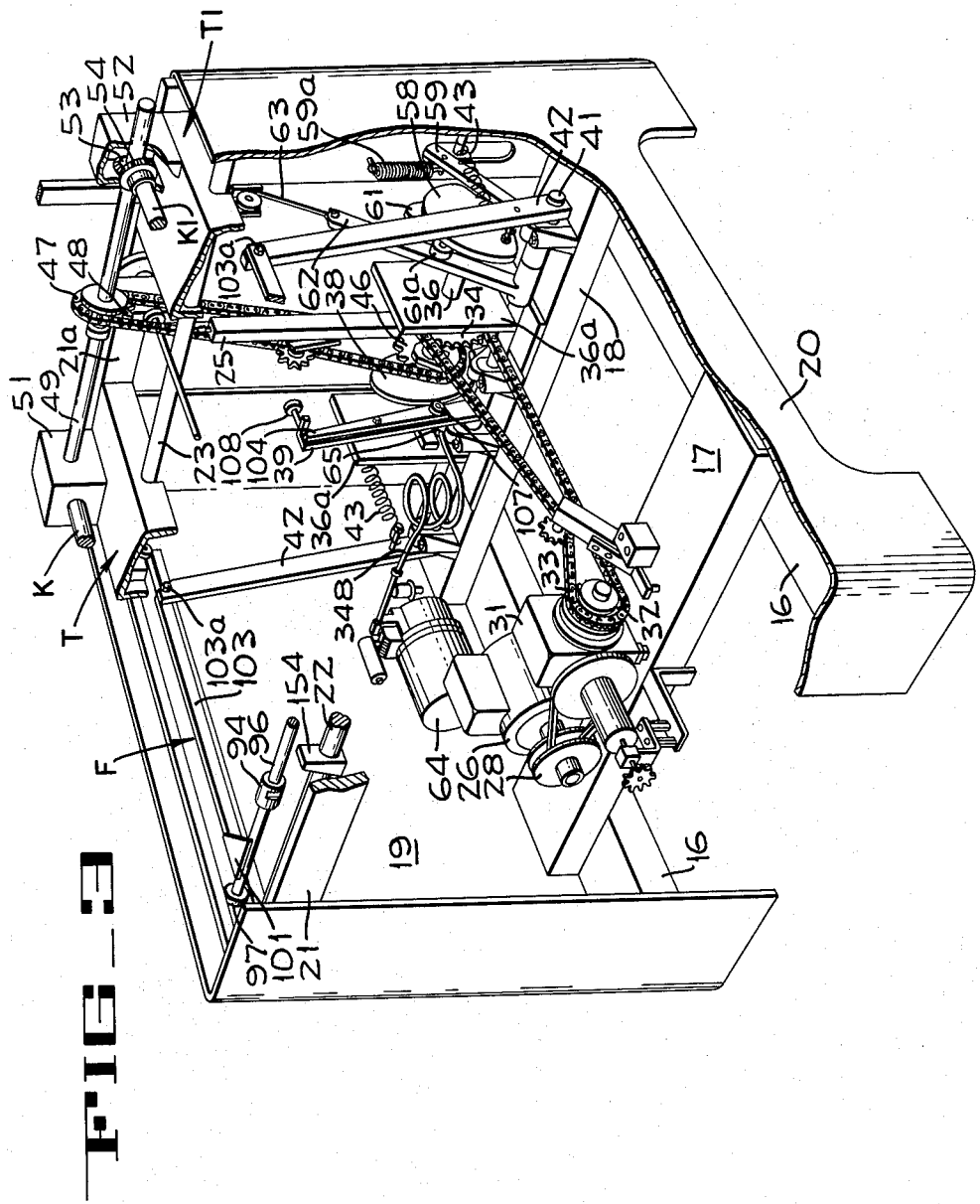

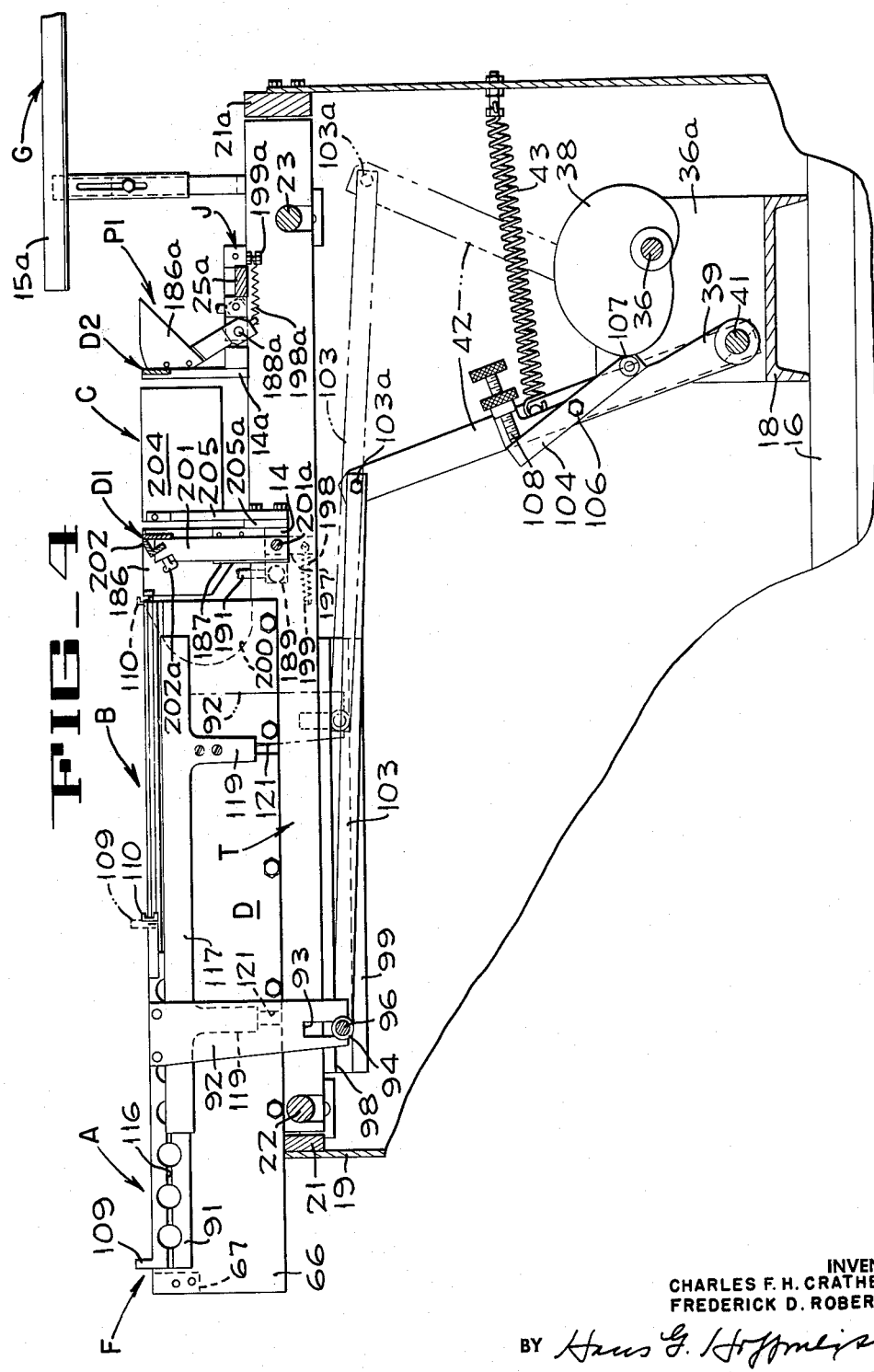

July 5, 1966  C. F. H. CRATHERN III, ETAL  3,259,030
FABRICATION OF BOX PARTS FROM PLASTIC MATERIAL
Filed March 21, 1963  15 Sheets-Sheet 5
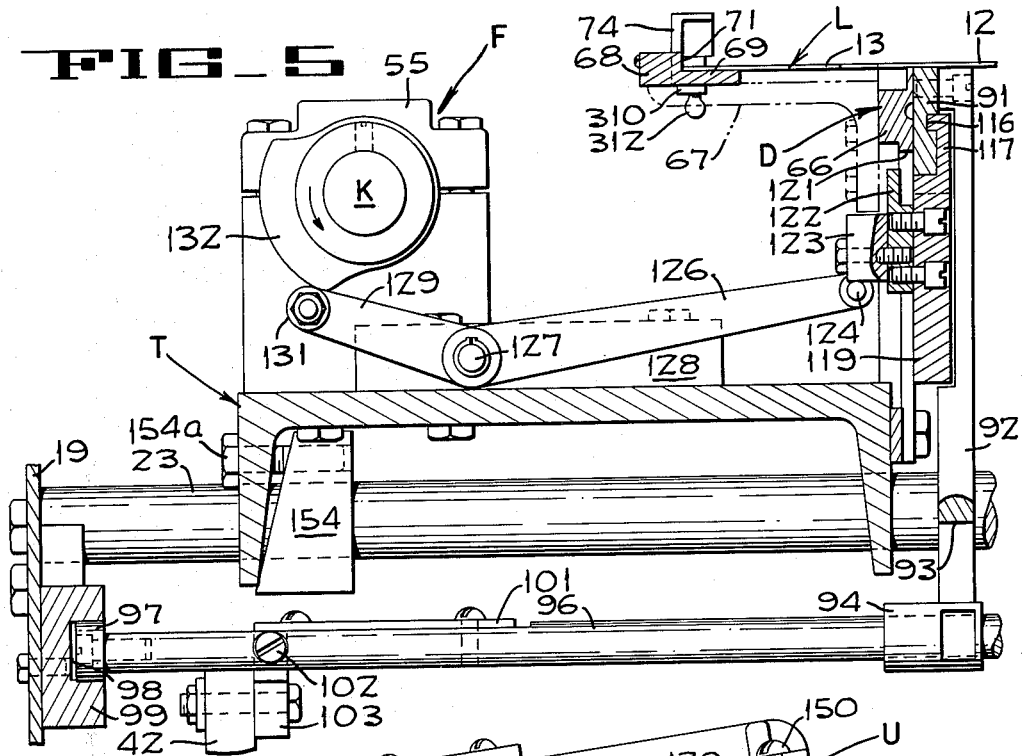
FIG_5
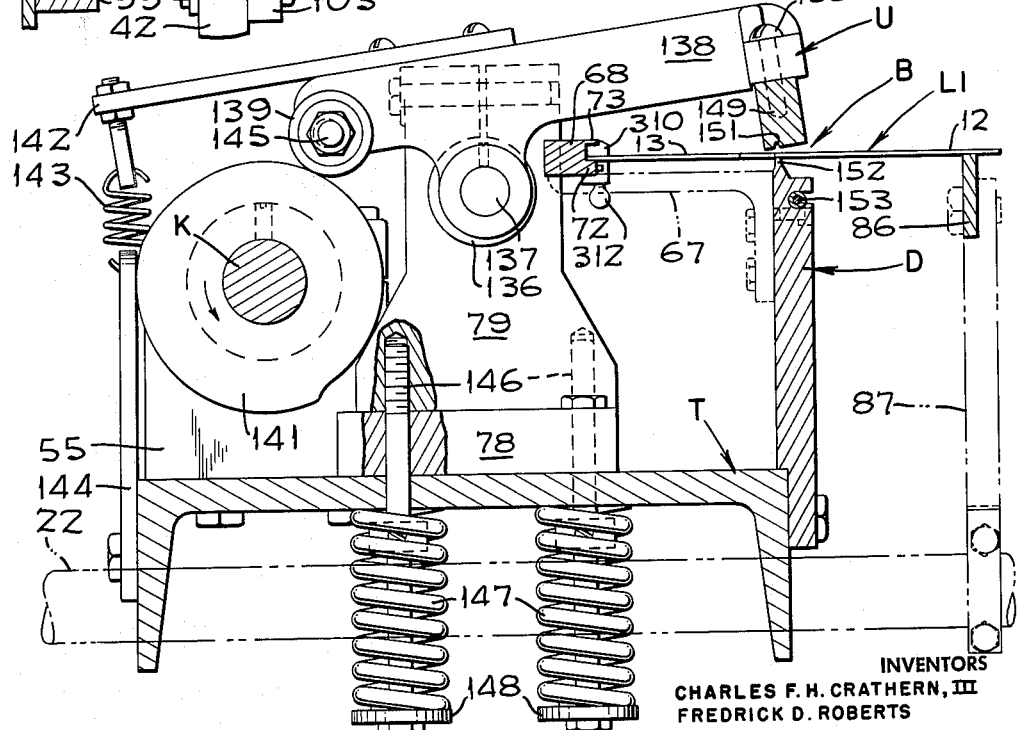
FIG_6
INVENTORS
CHARLES F. H. CRATHERN, III
FREDRICK D. ROBERTS
BY *Hans G. Hoffmeister*
ATTORNEY

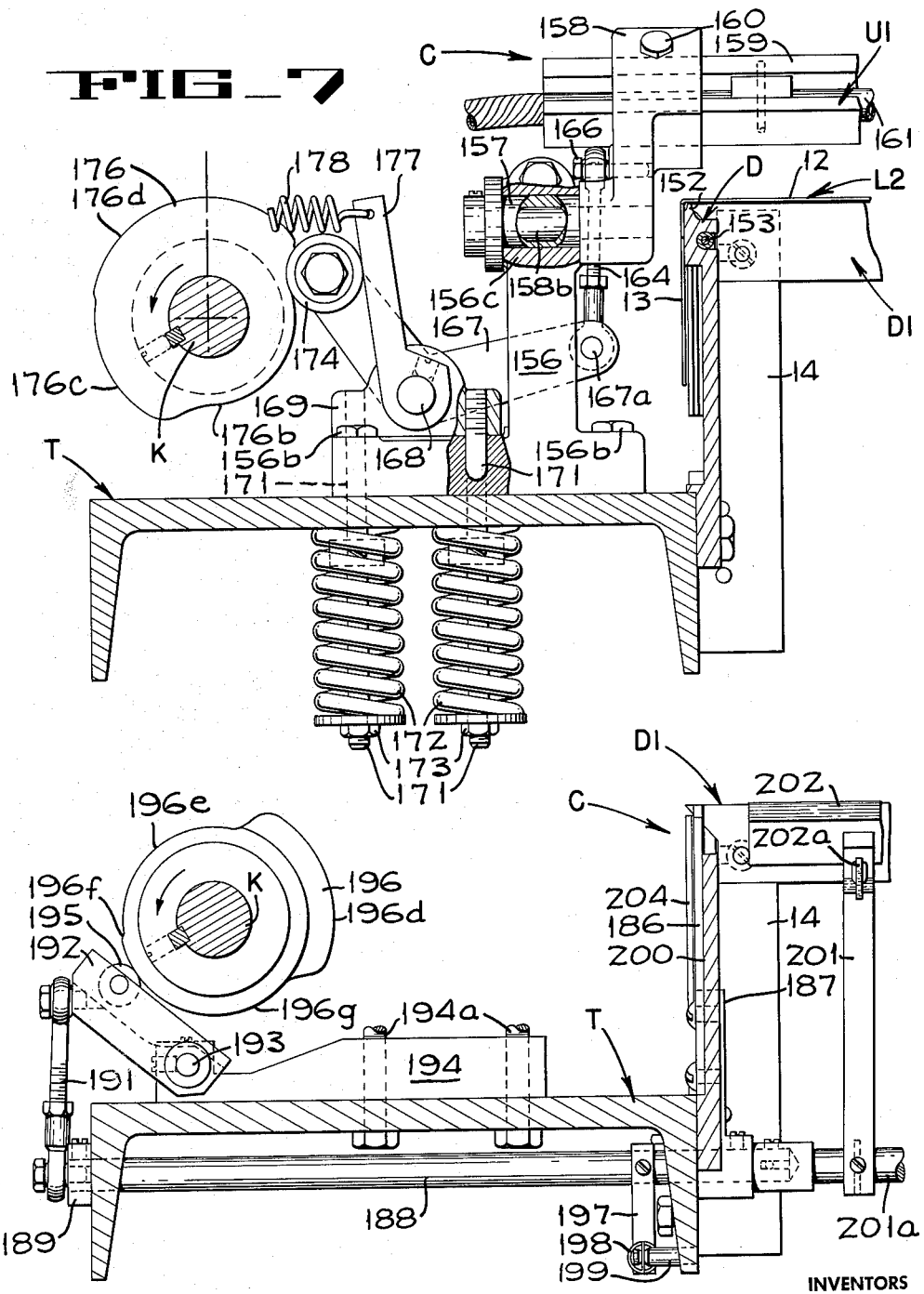

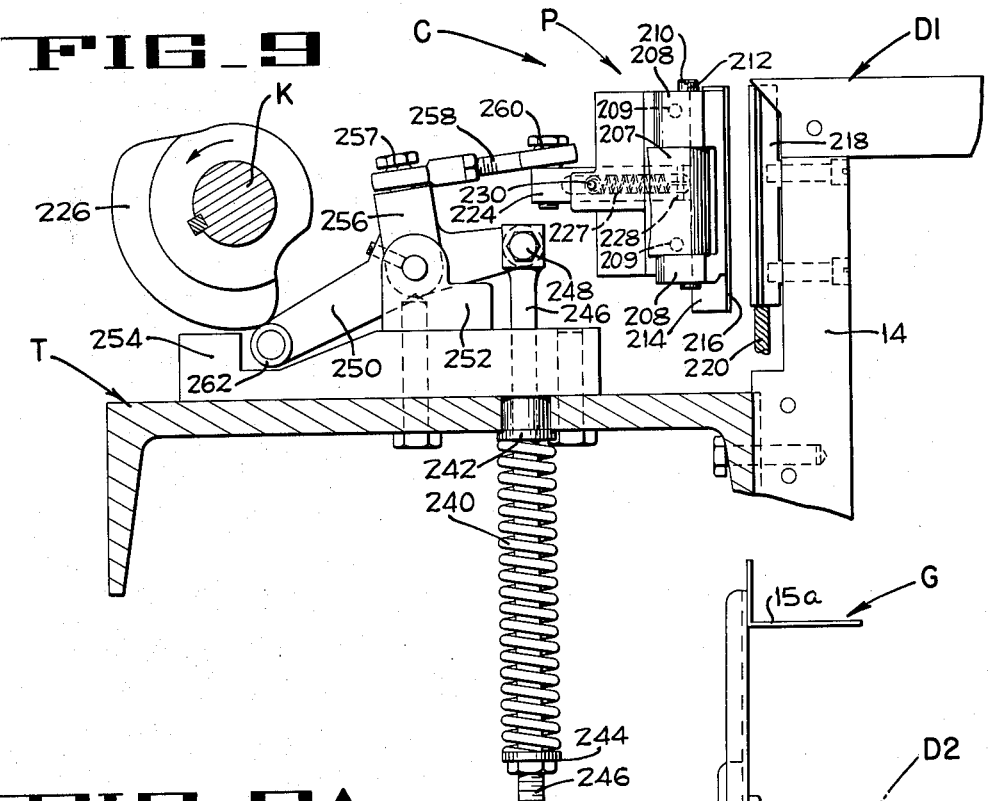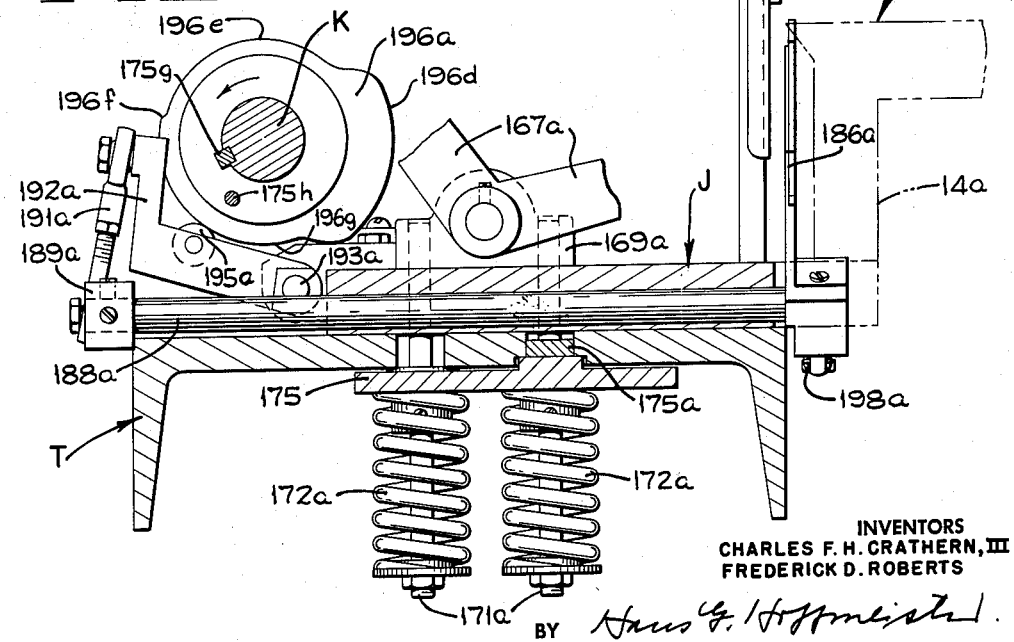

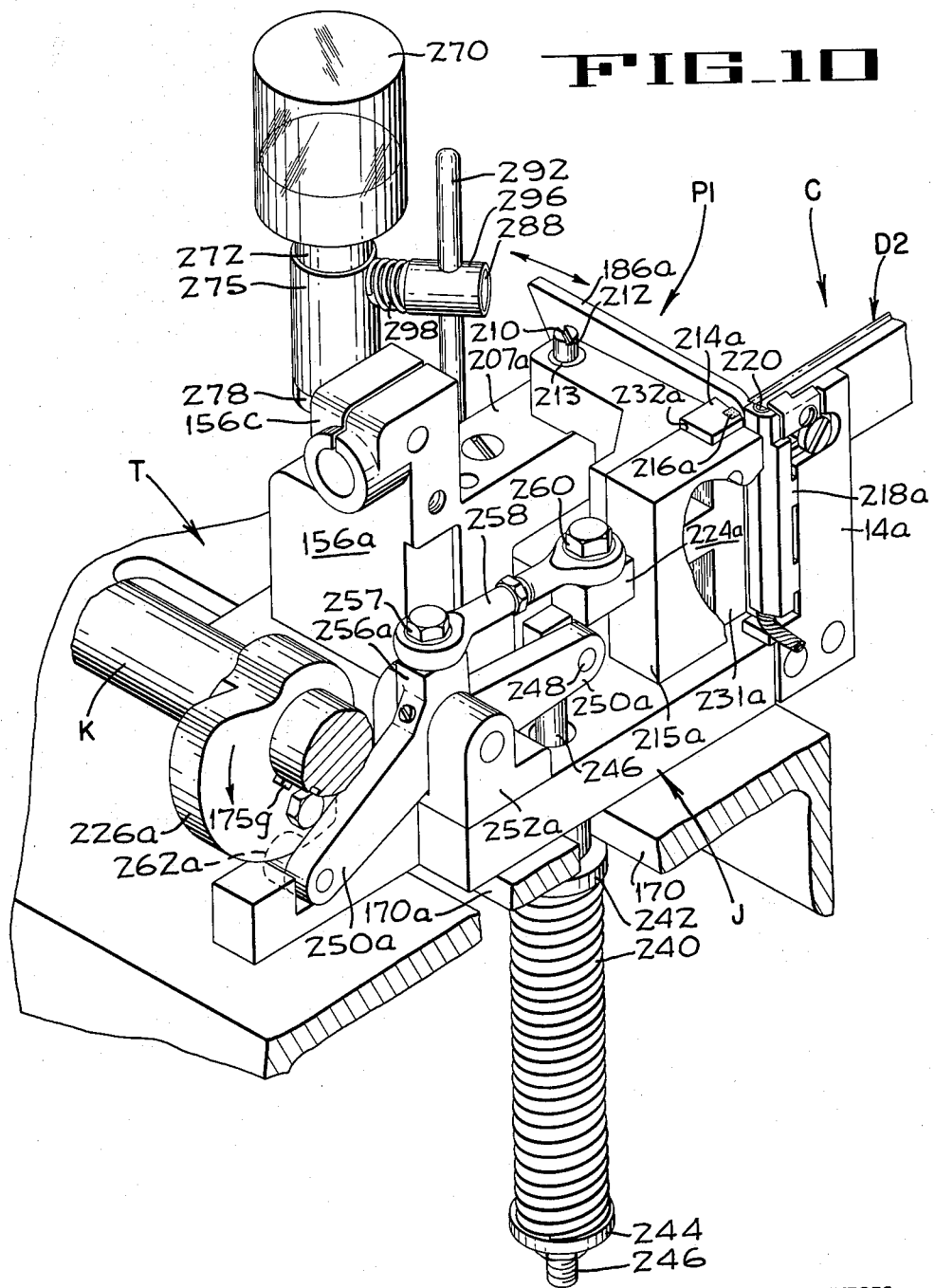

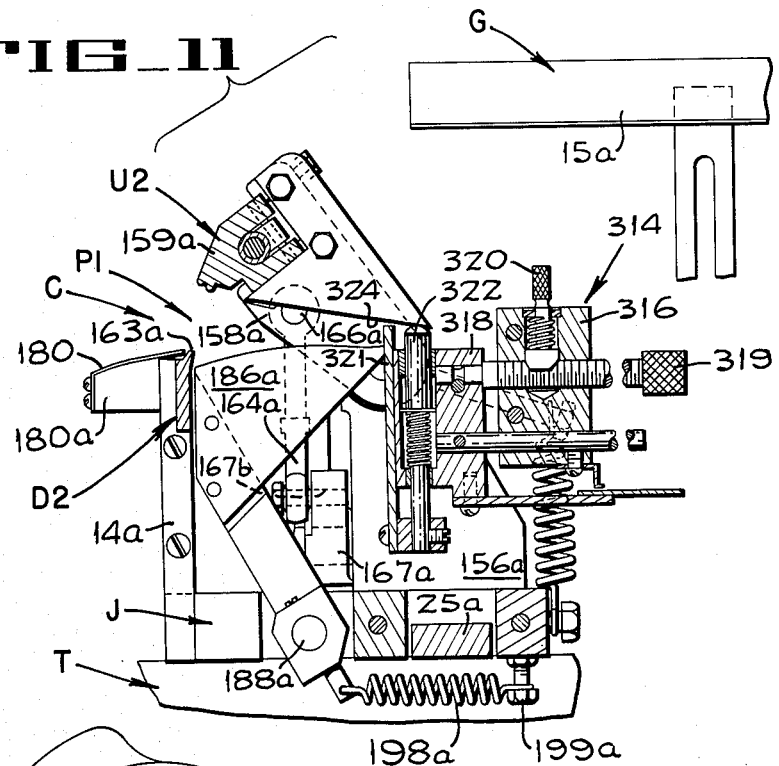
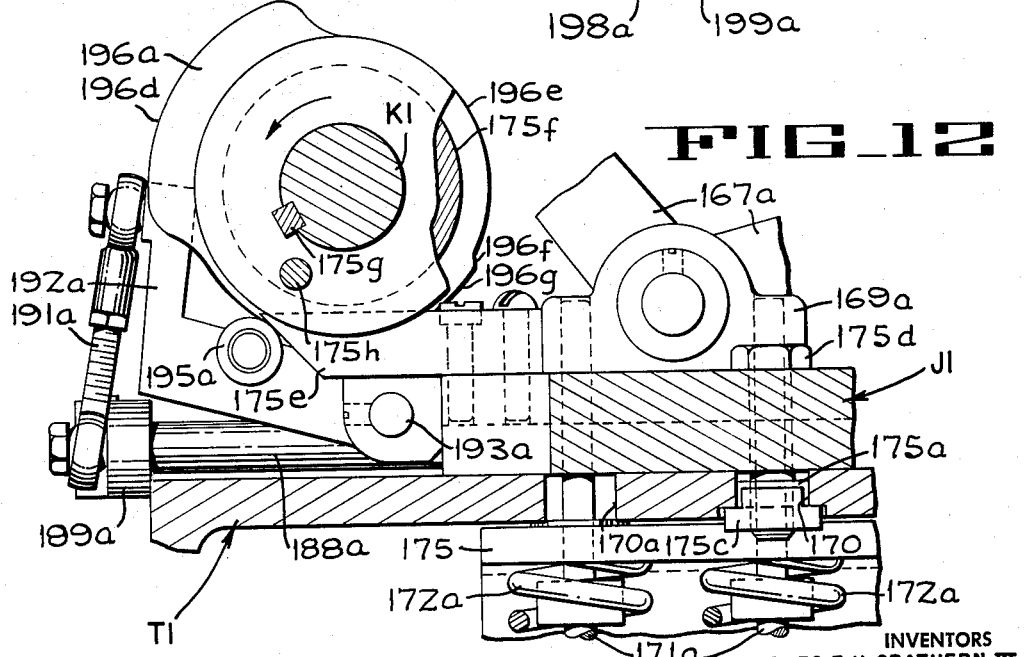

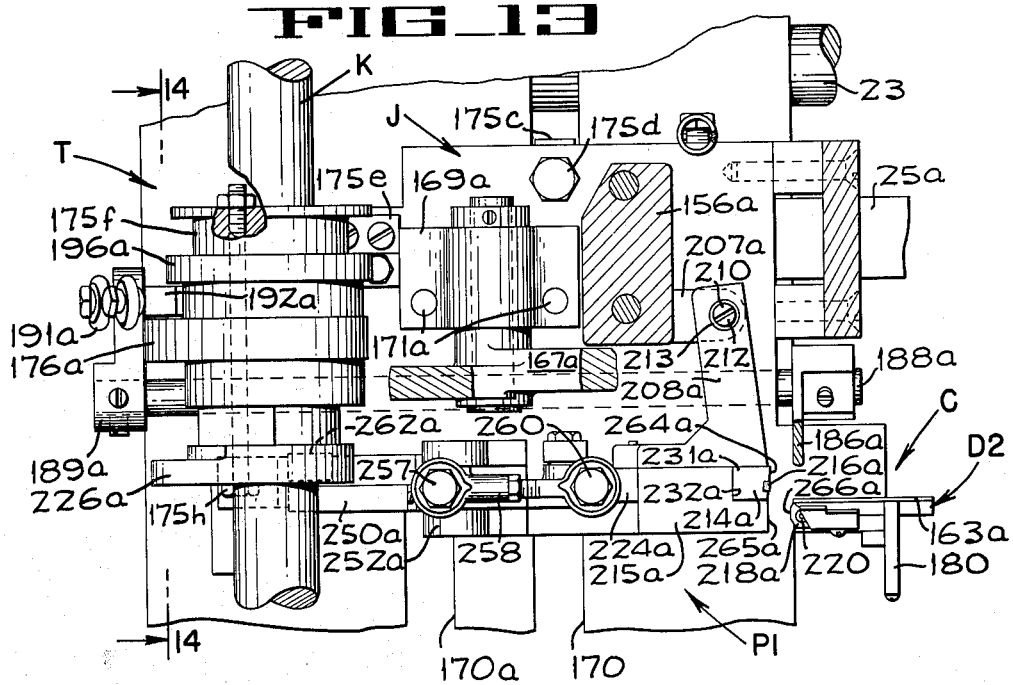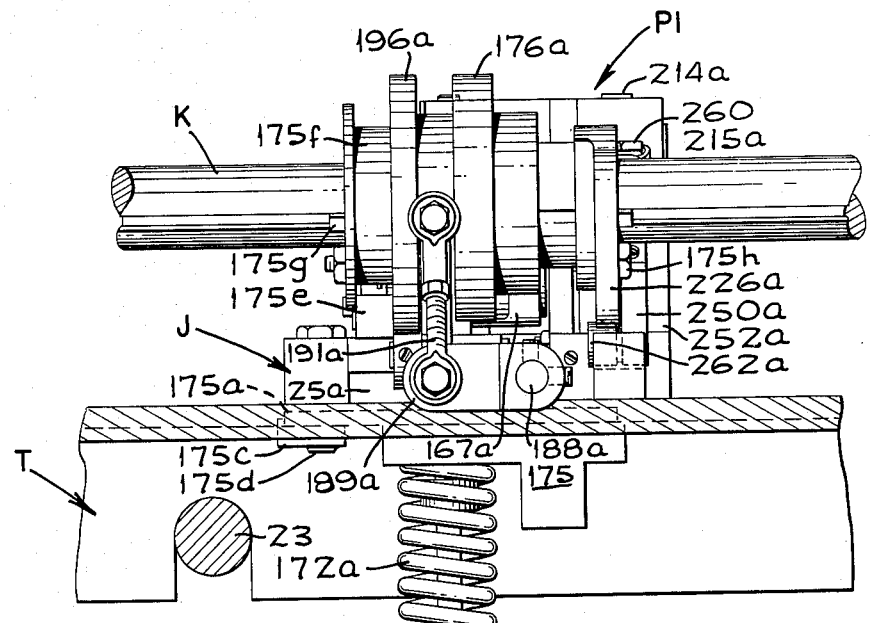

July 5, 1966     C. F. H. CRATHERN III, ETAL     3,259,030
FABRICATION OF BOX PARTS FROM PLASTIC MATERIAL
Filed March 21, 1963            15 Sheets-Sheet 11
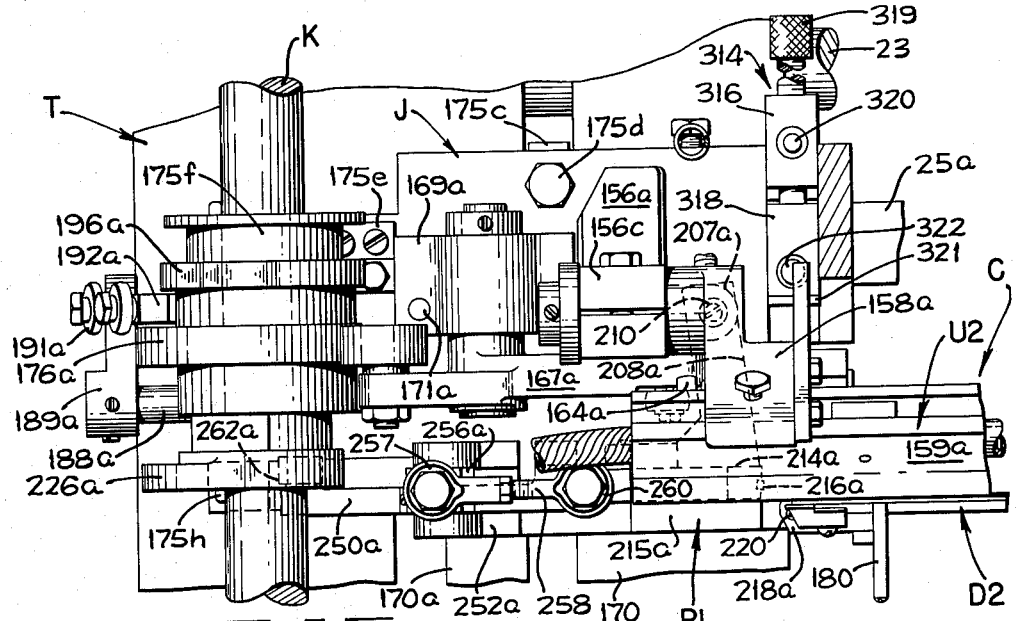
FIG_15
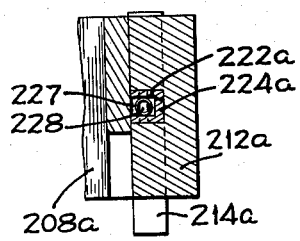
FIG_17
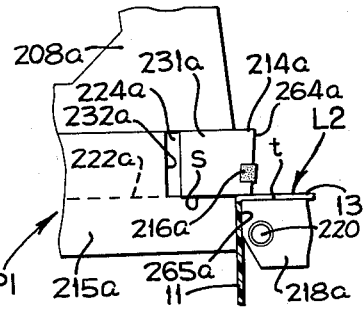
FIG_18
FIG_19
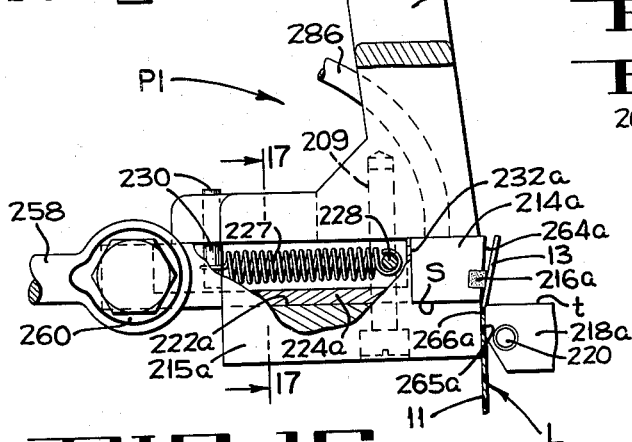
FIG_16
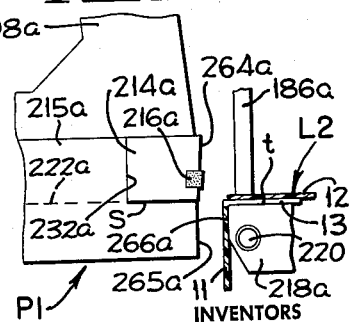
INVENTORS
CHARLES F. H. CRATHERN, III
FREDERICK D. ROBERTS
BY Hans G. Hoffmeister
ATTORNEY July 5, 1966 C. F. H. CRATHERN III, ETAL 3,259,030
FABRICATION OF BOX PARTS FROM PLASTIC MATERIAL
Filed March 21, 1963 15 Sheets-Sheet 12
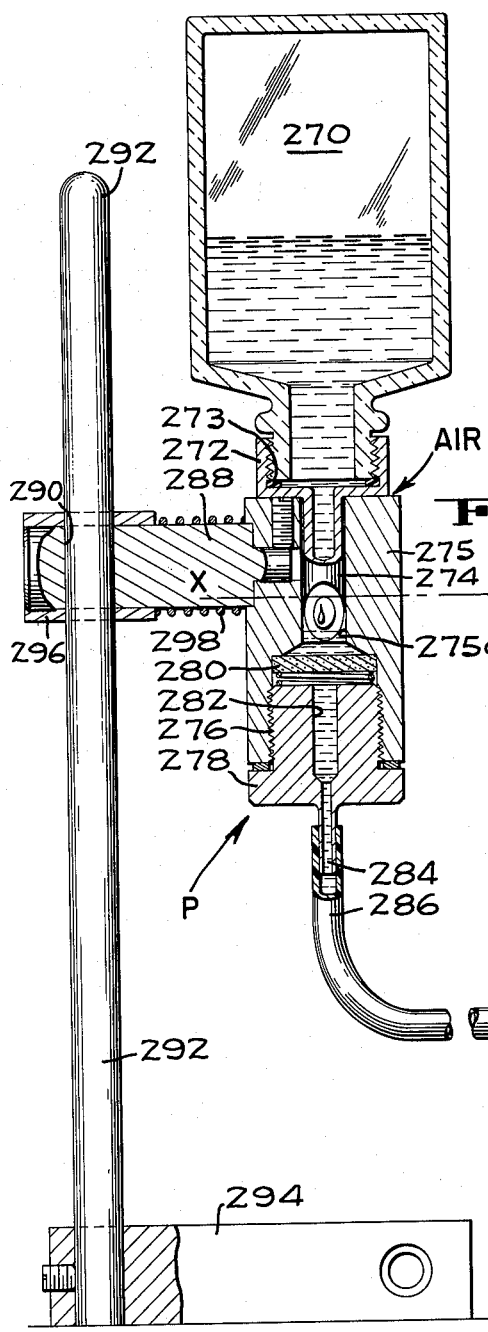
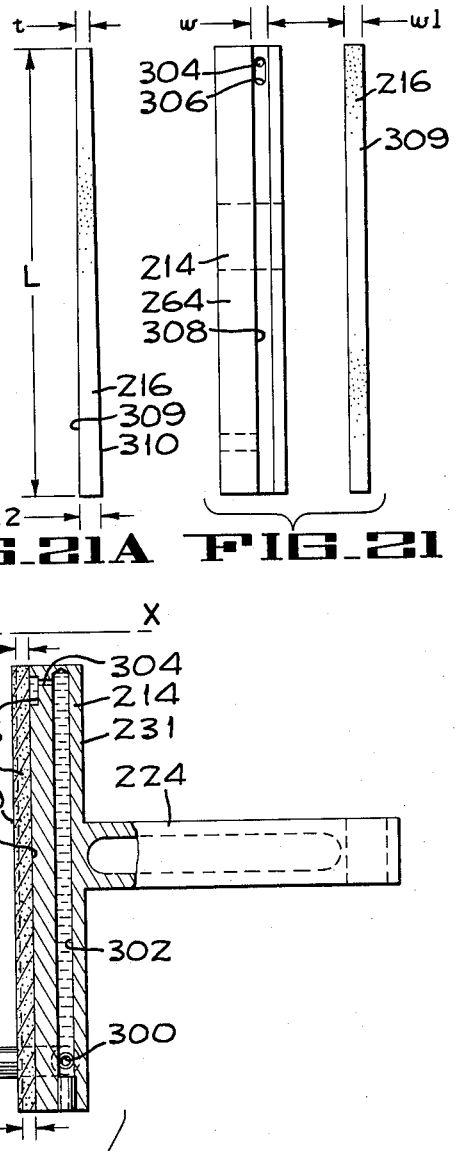
INVENTORS
CHARLES F. H. CRATHERN, III
FREDERICK D. ROBERTS
BY 
ATTORNEY

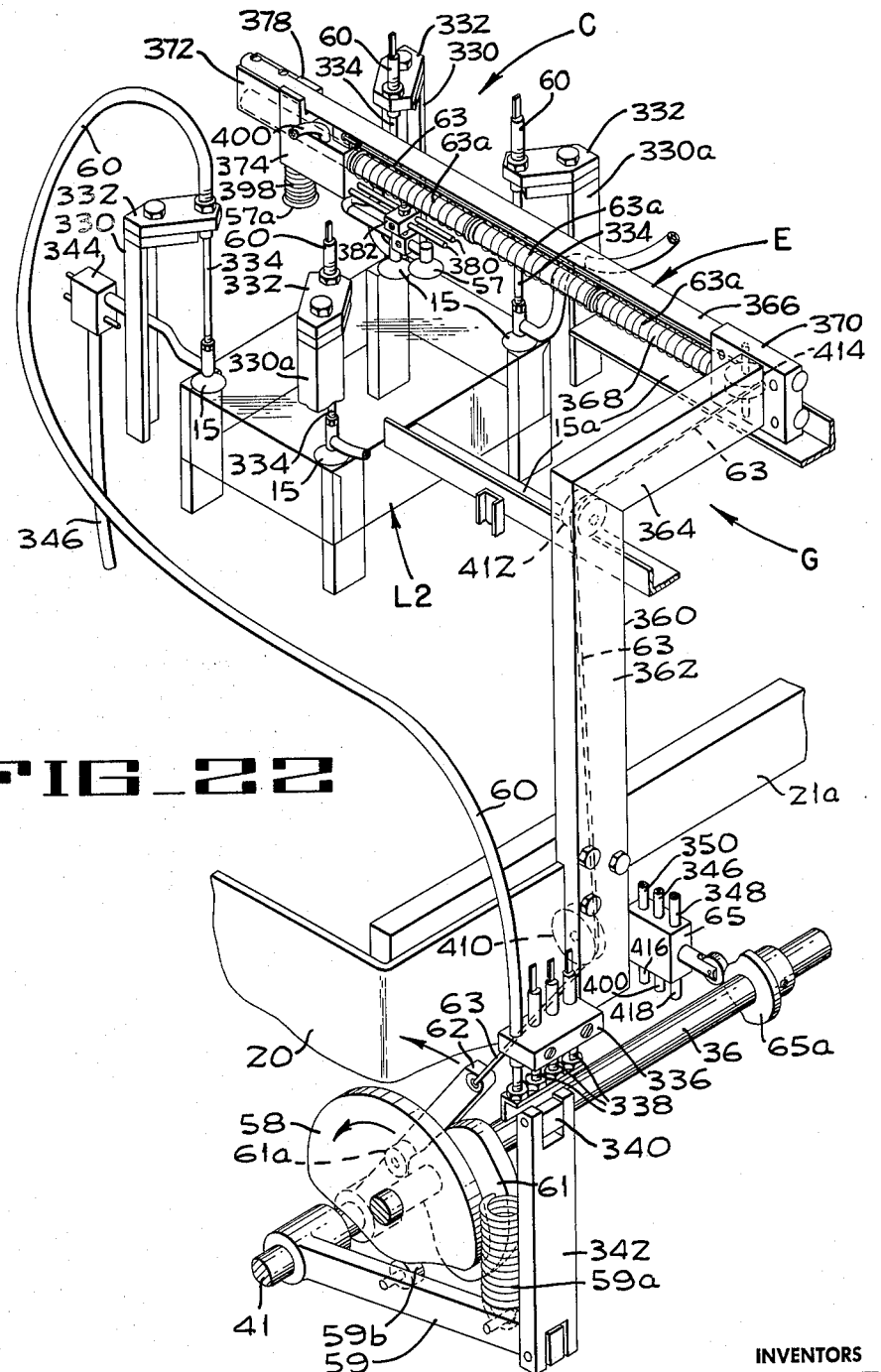

July 5, 1966  C. F. H. CRATHERN III, ETAL  3,259,030
FABRICATION OF BOX PARTS FROM PLASTIC MATERIAL
Filed March 21, 1963  15 Sheets-Sheet 14
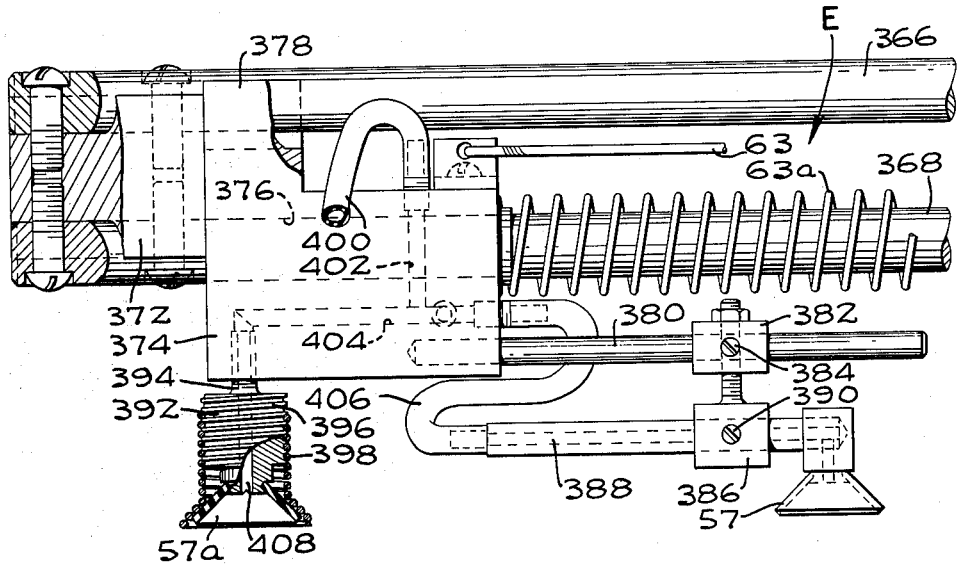
FIG_23
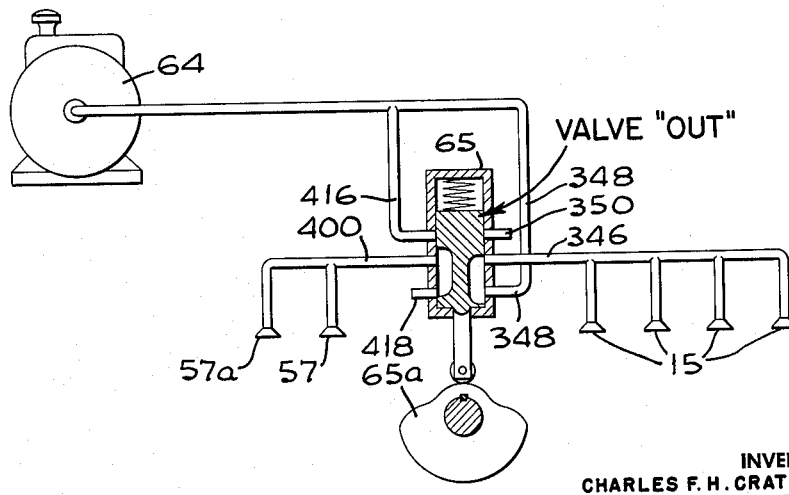
FIG_24
INVENTORS
CHARLES F. H. CRATHERN, III
FREDERICK D. ROBERTS
BY
ATTORNEY

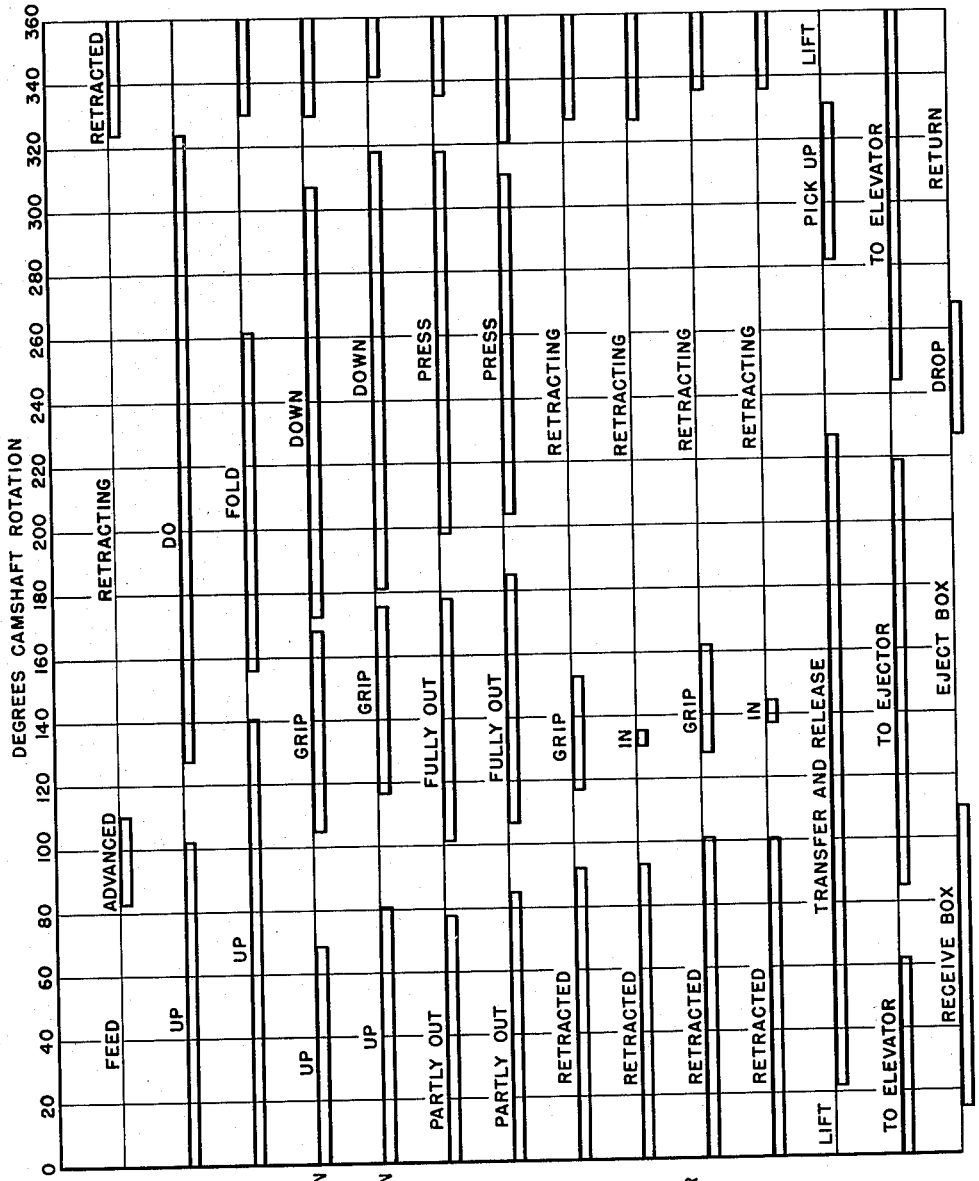

United States Patent Office 3,259,030
Patented July 5, 1966

3,259,030
FABRICATION OF BOX PARTS FROM PLASTIC MATERIAL
Charles F. H. Crathern III and Frederick D. Roberts, Contoocook, N.H., assignors to FMC Corporation, San Jose, Calif., a corporation of Delaware
Filed Mar. 21, 1963, Ser. No. 267,058
23 Claims. (Cl. 93—49)

This invention relates to box making and more particularly to the manufacture of boxes or box parts such as box bottoms and box lids, from blanks previously cut from thin sheet material.

This specification describes a box making machine of the general type described in the copending application of Carthern et al., Serial No. 97,374, filed March 21, 1961, now Patent 3,096,692, issued July 9, 1963, and assigned to the assignee of the present invention.

In accordance with the present invention the sheet material from which the blanks are formed is a plastic, of the type that will form a seal with itself by the application of a liquid plastic solvent at the joints, followed by the application of pressure. Heat is also applied to the joints. Plastic materials of this type are generally shiny and soft, and they are easily marred or scratched. Box parts formed of such material require careful handling, in order to maintain the initial sheen and attractive appearance of the plastic blank material from which the box parts are formed.

It is an object of the present invention to provide box parts formed of plastic material of the type described, which parts remain unmarred and unscratched during the forming operation, and with the panels of the completed box parts being unwrinkled, so that the complete box parts are attractive and neat in appearance.

Another object of the present invention is to provide for straight line progression or feeding of the material through the machine, from a registration station where the precut blanks are introduced into the machine, to the first and second folding stations, and during the removal of the completed box part from the machine.

A further object is to produce accurately dimensioned box parts, such that box parts made on the same machine can be used as either the lid or the bottom portions of an assembled box.

Another object is to provide box parts having square corners, with the tabs on the inside of the associated end panels of the box part, and with the bend of the tab at each corner of the box part being sharp and clean.

A further object of the invention is to facilitate sealing of corner tabs of plastic blanks to overlying side panels, by the use of a solvent for the plastic material, and to bend the tabs without touching the portions thereof to which the solvent has been applied.

It is an object of the present invention to provide a light gripping action on the blanks during solvent application to the tabs of the blanks. In the present invention this operation is performed by the second station movable blank folding dies, by interrupting their stroke when they first engage the side panels of the blank, and before they fold down the side panels.

Another object of the invention is to facilitate the bending of the tabs, and to accelerate the setting of a solvent applied thereto, by heating the anvils that back up the corners of the box and the tabs, during the corner sealing operation.

It is also an object of the present invention to provide careful handling of the finished box parts during their removal from the machine, in order to avoid marring and otherwise defacing the box parts. This careful handling also insures that the freshly formed, sealed corner joints will not open up, even if removal of the completed box part from the second folding station of the machine is initiated before the solvent that provided the seal has had time to permanently set. In fact, the removal and transfer apparatus for completed box parts of the present invention is so gentle in its action that it permits setting up of the solvent at the corner joints during the actual removal and transfer operations.

Still another object is to provide a removal system for completed box parts, wherein the box parts are removed from the fixed folding dies at the second folding station by vacuum cups, and wherein the height of the vacuum cups relative to the die is unaffected by adjustment of the dies and associated parts for various box sizes.

A further object of the invention is to expedite release of the unfinished boxes from a vacuum cup transfer device provided at the box removal station.

It is also an object of the present invention to provide uniform distribution of solvent along the entire length of a porous vertical solvent applicator strip, even though the solvent feeder provides a gradually increasing static head on the applicator strip, from the top to the bottom of the strip.

Another object of the present invention is to minimize the solvent requirements of the applicator system.

It is also an object of the present invention to eliminate solvent run-off from the solvent applicator, and to render unnecessary the use of a solvent scavenging system, such as a vacuum solvent scavenging assembly.

An additional object of the present invention is to provide uniform replacement of solvent removed from the solvent applicator in set ups wherein only a portion of the applicator is employed in the sealing operation, that is, wherein the applicator engages the tab of the box part along only a portion of its length.

This and other objects referred to relative to solvent application are accomplished by forming a solvent applicator that includes a porous application strip or insert, formed of compacted and sintered bronze power, with the density of the insert increasing progressively from the top to the bottom of the strip.

Accordingly, another object of the invention is to provide a simple and effective method for making an elongated porous solvent applicator insert and body assemblage of the type referred to, and wherein the porous applicator insert increases in density progressively, from the top to the bottom thereof.

It is also an object of the present invention to facilitate maintaining a desired static head of liquid solvent on the applicator, in order to control the amount of solvent dispensed by the porous applicator insert or strip, during operation.

A further object of the invention is to compensate for over-all variations in density between the porous applicator inserts or strips at the various individual applicators on a single machine.

The manner in which these and other objects of the present invention may be accomplished by those skilled in the art, will be apparent from the following detailed description of the invention.

In the drawings:

FIG. 1 is a simplified perspective diagram showing the sequence of operations performed by the apparatus of the invention.

FIG. 2 is a plan of the apparatus, with the ejector mechanism removed for clarity of illustration.

FIG. 3 is a fragmentary perspective showing the main frame and table parts, and portions of the drive train.

FIG. 4 is a longitudinal section taken on lines 4—4 of FIG. 2, showing the feed mechanism and the inboard and outboard tuck plates. In this figure as in other figures, parts not directly contributing to the operational step being illustrated in the figure have been removed, or only parts thereof are shown.

FIG. 5 is a transverse section taken on lines 5—5 of FIG. 2 showing mechanism for raising and lowering the blank feed or pusher mechanism.

FIG. 6 is a transverse section taken on lines 6—6 of FIG. 2, showing mechanism for raising and lowering one of the longitudinally extending upper folding dies, disposed at the first folding station.

FIG. 7 is a transverse section taken on lines 7—7 of FIG. 2, showing mechanism for raising and lowering the inboard, laterally extending upper folding die, at the second folding station.

FIG. 8 is a transverse section taken on lines 8—8 of FIG. 2, showing the mechanism for operating one of the inboard tuck plates.

FIG. 9 is a section taken on lines 9—9 of FIG. 2, showing an inboard solvent applicator and sealing head, and the operating mechanism therefor.

FIG. 9A is a transverse section taken on lines 9A—9A of FIG. 2 showing the drive mechanism for one of the outboard tuck plates.

FIG. 10 is a perspective of an outboard solvent applicator and sealing head assembly, and the operating mechanism therefor.

FIG. 11 is a section taken on lines 11—11 of FIG. 2, showing the outboard die assembly, tuck plate, and blank stop mechanism.

FIG. 12 is a transverse section taken on lines 12—12 of FIG. 2, showing a cam set and its shifting assembly.

FIG. 13 is a plan of a corner block assembly with parts broken away, showing the sealing mechanism and the cam set shifting construction.

FIG. 14, is a fragmentary longitudinal section taken on lines 14—14 of FIG. 13, showing the construction of a corner block assembly.

FIG. 15 is a plan like that of FIG. 13, with the outboard upper die mechanism in place.

FIG. 16 is an enlarged plan of a corner sealing unit, with parts broken away, showing the panel gripper block fully advanced, but with the combined solvent applicator and tab folder plunger only partially advanced, for application of solvent to a tab.

FIG. 17 is a fragmentary section taken on lines 17—17 of FIG. 16.

FIG. 18 is a fragmentary plan like FIG. 16, showing the panel gripper block with its associated solvent applicator and tab folding plunger fully advanced, to complete the bending of a tab.

FIG. 19 is a plan like FIG. 18, with the solvent applicator and tab folder plunger, and associated panel gripper block retracted.

FIG. 20 is a section showing the solvent supply system.

FIG. 21 shows the tab folder plunger and the sintered bronze solvent applicator strip before their assembly.

FIG. 21A is a side elevation of the applicator strip.

FIG. 22 is a perspective diagram of the box elevator and ejector system.

FIG. 23 is a fragmentary elevation of the ejector assembly, with parts in section.

FIG. 24 is a simplified diagram of the vacuum connections.

FIG. 25 is a timing chart.

In the detailed description of the apparatus of the invention that follows, the sequence of operation, and the frame and drive train assembly will first be described in general. There will follow a detailed explanation of the construction and operation of operating units of mechanism at the various stations, the order of presentation in the detailed description being (in general), that of tracing one blank through the machine. There will then be presented a brief summary of the entire operation, following the same plan.

The sheet material from which the blanks L are formed can be characterized as a thermoplastic plastic material. This term is used to refer to synthetic (plastic) materials such as cellulose acetate, plasticized polyvinyl chloride and co-polymers thereof, polystyrene, a co-polymer of styrene and acrilonitrile, etc. These materials can be softened with a solvent preparatory to a sealing operation, which operation is performed with the use of heat and pressure. Laminates of plastic over a paper base can also be used.

*Sequence of operations*

The schematic diagram of FIG. 1 has been highly simplified, and only a few of the moving parts of the apparatus have been illustrated in the figures. At the forward, or blank receiving end of the machine, there is a registration station A, in which previously notched and tabbed unfolded blanks L are placed one by one by the operator. A feed mechanism, indicated generally at F, advances the unfolded blank L along a pair of laterally spaced, longitudinally extending lower folding dies D. As indicated in the figure, the blanks have a top panel 10, longitudinally extending end panels 11, and laterally extending side panels 12. The assignation of the terms side and end panels is purely arbitrary, and is not critical to the present invention. As illustrated, the machine is set up to receive blanks in which the longest dimensions of the blank are the lateral dimensions, so that as the longitudinally extending panels 11 will be considered to be the end panels of the completed box part. Projecting from the end panels 11 are tabs 13, which form sealing tabs for the corners of the folded box part, which box part may be either the bottom of the box, or its lid, and which for convenience will be referred to as a "box" or a "box part."

After the blanks have been fed from the registration station A to the first folding station B, the end panels 11 and their tabs 13 are folded down at the first folding station B, on the longitudinally extending lower dies D. These folds are made by movable upper dies U, not shown in FIG. 1, but which appear in plan in FIG. 2, and one of such dies appears in section in FIG. 6. The partially folded blanks L1 are then advanced from the first folding station B to the second folding station C, which includes inboard laterally extending lower dies D1 supported by anvils 14, and outboard dies D2 supported by anvils 14a. Here the blanks L1 are gripped by upper folding dies U1 and U2. These dies do not appear in FIG. 1, but are shown in plan in FIG. 2, and die U2 (which is like die U1), appears in section in FIG. 11.

At each corner of the second folding station C are mounted combined solvent applicator and tab bending assemblies. One of such assemblies P at the inboard die D1 and anvil 14 is shown in phantom in FIG. 1. An outboard assembly P1 appears in plan in FIG. 13. While the blanks are gripped at station C by the upper dies U1 and U2, the combined solvent applicator and tab bending plunger assemblies P and P1 are operated to grip the margins of end panels 11, apply solvent to the tabs 13, and fold the tabs against the vertical anvils 14 at the inboard lateral lower die D1, and against the anvils 14a at the outboard lateral lower die D2.

The side panels 12 are then folded down by the upper folding dies U1 and U2, which up to this time have been merely gripping these panels. The edges of the side panels 12 are now pressed against the previously folded, solvent coated tabs 13, by tuck plates, which do not appear in FIG. 1, but which are shown at 186 and 186a in FIG. 4. The completed box parts L2 are then lifted vertically by suction cups 15, operated by a vacuum cup elevator mechanism that is not shown in the diagram of FIG. 1, but which appears in FIG. 22. The elevators lift the completed box parts L2 clear of the outboard die assemblies. A reciprocating vacuum cup ejector mechanism E receives the completed box parts from the elevator vacuum cups, then moves the completed box parts L2 rearwardly of the apparatus to a discharge station G, wherein the previously completed box parts (not shown) in FIG. 1 will be resting on support rails 15a. As each completed box part L2 is moved rearwardly of the machine by the ejector mechanism E, the new box part pushes the previously formed box part along the rails 15a, clear of the discharge station G, and onto a suitable conveyor (not shown), and which forms no part of the present invention. The ejector E then releases the newly formed box part, so that it rests on the rails 15a.

The frame and drive train

Reference is now made to FIGS. 2 and 3, FIGURE 3 being a simplified schematic perspective diagram. The frame structure of the apparatus includes a pair of laterally spaced longitudinally extending bed plates 16, on which are mounted a front cross plate 17 and a rear cross plate 18, these being of channel section. Partly enclosing the apparatus, and serving as part of the frame, are a left side plate 19, and a right side plate 20, connected by a front crossbar 21 (FIG. 3) and a rear crossbar 21a (FIG. 4). The side plates support a front cross rod 22 and a rear cross rod 23 that form part of the box length adjustment mechanism. An intermediate support or jack post 25 is provided for the rear cross rod 23, because it supports more weight than does the front cross rod 22.

Adjustably mounted on cross rods 22 and 23 are two longitudinally extending channel members T and T1, to be referred to as tables. Both tables have been almost completely broken away in FIG. 3. These tables mount drive shaft and cam assemblies for the movable upper dies U (FIG. 6) U1 (FIG. 7) and U2 (FIG. 2) and for operating the tab folders and truck plates to be described presently. The lateral spacing of the tables T and T1 can be varied to adjust for box length. As seen in FIGS. 2, 9A and 10, corner blocks J and J1 are mounted on tables T and T1, adjacent the rear of the machine. These corner blocks are adjustable longitudinally along the tables T and T1, respectively, and they mount the outboard lower die D2, and the upper movable die U2. The longitudinal spacing of the outboard lower die D2 from the inboard lower die D1, determines the box width.

As seen in FIG. 2, in order to shift the corner blocks J and J1 along the tables T and T1 for box width adjustment, the corner blocks are connected by a cross bar 25a for simultaneous movement along the tables. A corner block adjusting screw 25b is threaded into a nut 25c fixed on cross bar 25a, and rotation of a hand wheel 25d mounted on the screw 25b effects longitudinal shifting of the corner blocks J and J1, and the mechanism mounted thereon. As mentioned, in order to adjust the machine for box length the tables T and T1 can be shifted laterally on rods 22 and 23, and this is accomplished by adjusting screws 25e which carry adjusting hand wheels 25f (FIG. 2).

The basic elements of the drive train also appear in FIG. 3, but the drives for the elevator and ejector parts are best seen in FIG. 22. Referring to FIG. 3, a motor 26 is mounted on the front cross plate 17, previously referred to. The motor drives a variable speed V-belt assembly 28, which drives into a gear reducer 31. The gear reducer drives a sprocket 32, a chain 33, and a sprocket 34, keyed to a countershaft 36 at the rear of the machine. Countershaft 36 rotates in bearings mounted in plates 36a projecting upwardly from the rearward cross plate 18.

In order to operate the blank feeder mechanism, to be described in detail presently, a cam 38 is keyed to countershaft 36, which cam oscillates a lever 39 that is keyed to a rockshaft 41, mounted in bearings on the cross plate 18. The rockshaft 41 oscillates a pair of feeder advancing and retracting levers 42, which levers are keyed to the ends of the rockshaft. This structure appears in FIG. 3, as well as in FIG. 4. Levers 42 are positively actuated in the retract direction by the cam 38, and are moved in the feed direction by springs 43.

The countershaft 36 also drives the upper die, corner plunger, and tuck plate mechanism on tables T and T1, which mechanisms will be described in detail presently. As seen in FIG. 3, a sprocket 46 is keyed to the countershaft 36, and drives a chain 47 trained around a sprocket 48 keyed to an upper countershaft 49. Countershaft 49 drives a left-hand gear box 51 and a right-hand gear box 52, these gear boxes being mounted on tables T and T1, respectively. In each gear box (FIG. 3), bevel gears 53 are keyed to and slidable along the countershaft 49. Bevel gears 53 drive bevel gears 54 keyed to main camshafts K and K1, which camshafts extend longitudinally along the tables T and T1, respectively. These camshafts are mounted in bearing blocks 55 (FIG. 2) fastened to the tables T and T1.

As mentioned, in order to remove the completed box part from the lower dies D1 and D2 a vacuum cup elevator mechanism is provided (FIG. 22). This mechanism includes the vertically movable vacuum cups 15 previously referred to, for raising completed boxes from the lower folding dies D1 and D2 and anvils 14 and 14a at the second folding station C. The elevator vacuum cups 15 lift the box parts L2 against vacuum cups 57 and 57a of the longitudinally reciprocable ejector mechanism E, previously mentioned. The ejector mechanism E (FIGS. 1, 22 and 23) moves the completed box parts L2 rearwardly of the machine, to the rails 15a at the discharge station G, previously referred to.

Referring to FIGS. 3 and 22, the elevator vacuum cups 15 are raised by a cam 58 on the countershaft 36. Cam 58 oscillates a lever 59 connected to the elevator vacuum cups 15 through flexible push-pull cables 60. The elevator vacuum cups 15 are lowered by a spring 59a connected between the frame and lever 59. The vacuum cups 57 of the ejector mechanism E are moved rearwardly from their pickup position by a cam 61 on a countershaft 36. Cam 61 shifts the ejector vacuum cups by means of a lever 62, which moves the ejector vacuum cups 57 rearwardly through a flexible cable 63 (FIGS. 22 and 23). The ejector vacuum cups are moved forwardly to their pickup position by springs 63a, FIG. 22. The vacuum for the elevator vacuum cups 15 and for the ejector vacuum cups 57 is supplied by a vacuum pump 64 (FIG. 3) which is connected to a valve 65 (FIGS. 22 and 24), operated by a cam 65a.

This completes the general description of the operation and basic construction of the apparatus. A detailed description and explanation of the operation of the apparatus at each of the stations previously mentioned will now be presented.

The registration station

Elements of the registration station A are seen in FIGS. 2 and 4–6. This structure, as well as the feeder assembly, is like that of the aforesaid co-pending application of Crathern et al., Serial No. 97,374. When the blanks L are initially placed in the machine at the registration station A, the blanks are partially supported by forwardly projecting extensions 66 of the lower dies D. These extensions are also indicated in FIG. 1. Brackets 67 extend laterally outwardly from the forward ends 66 of the lower dies D, to adjustably support blank side guides 68, extending longitudinally of the apparatus. The side guides 68 support the longitudinally extending flaps 11 of the blanks. The side guides 68 have lower blank supporting flanges 69 that slidably rest on the laterally extending brackets 67, as indicated in FIG. 5. The side guides 68 are each formed with a blank guiding shoulder 71, which shoulders determine the lateral position of the blanks. As seen in FIG. 6, the rearward portions of the side guides 68, disposed at the first folding station, are provided with narrow flanges 72 which releasably support the end panels 11, before the latter are bent down by the upper dies U (FIG. 6) disposed at the first folding station B. Upward bowing of the end panels 11 is prevented by upper flanges 73 (FIG. 6)

formed on the side guides 68. As illustrated in FIGS. 2 and 5, a blank deflector 74 is disposed between the registration station A and the first folding station B. This deflector insures that blanks will be guided between the lower flange 72 and the upper flange 73 (FIG. 6) of each side guide 68.

As seen in FIG. 2, a pair of blocks 78 is mounted on each table T and T1, and blocks 78 carry upwardly projecting bearing blocks 79, which mount the upper folding dies U at the first folding station.

As seen in FIGS. 2 and 6, there are two auxiliary and longitudinally extending blank support rails 86 mounted on posts 87, which posts are adjustably mounted on the forward cross rod 22. The posts 87 and rod 22 are indicated in phantom in FIG. 6. Rails 86 may not be needed in the assembly if the lateral dimension (length) of the box part is small.

*The feed mechanism*

As previously mentioned, the feed mechanism of the machine of the present invention is like that of the copending application of Crathern et al., Serial No. 92,374. The feed mechanism advances a blank L from the registration station A to the first folding station B, and simultaneously advances a partially folded blank L1 from the first folding station B to the second folding station C. The feed mechanism has two motions, a reciprocating motion for advancing the blanks and for retracting to starting position, and a vertical motion for causing the feed mechanism to lower at the start of the retract stroke, so as to not disturb the previously fed blanks, and to rise again at the starting position, ready to feed two blanks at a time.

The reciprocating mechanism of the feed mechanism F will first be described, primarily in connection with FIGS. 4 and 5. Disposed against and just inside of each extension 66 of the lower longitudinal dies D, is a longitudinally extending feed bar 91, which bars will be referred to as carriages. Since the feed mechanisms at each side of the machine are the same, only the mechanism at one side of the apparatus will be described in detail.

As best seen in FIG. 4, depending from the carriage 91 is a carriage reciprocating arm 92, formed with a vertically extending slot 93. As seen in FIG. 5, a notched bushing 94 slides in the slot 93 in arm 92, and extending through the bushing 94 is a transverse carriage pusher rod 96, having rollers 97 (see FIG. 2 also) at each end thereof. The rollers 97 ride in tracks 98 formed in longitudinally extending guide rails 99 fastened to the side panels 19 and 20, respectively. As is also seen in FIG. 5, in order to reciprocate rod 96 and carriages 91, a gusset plate 101 is bolted to the transversely extending pusher rod 96, and is attached to one end of a generally longitudinally extending link 103. The link 103 is notched to receive the transverse pusher rod 96, the notch not appearing in FIG. 4, but it is seen in FIG. 5. The notched link is connected to the rod 96 by a screw 102. One link 103 appears in side elevation in FIG. 4, and as there seen, the right end of each link 103 pivotally connects, by a pivot 103a, to the upper end of the associated crank arm 42, previously described. Each crank arm 42 is keyed to the rockshaft 41, as was explained in the description of FIG. 3.

In order to adjust the apparatus for the width (depth) of the trailing laterally extending side panel 12, the horizontal position of the feed carriages 91 on the lower dies D can be precisely adjusted by cam follower mechanism illustrated in FIG. 4. An adjusting cam follower lever 104 is pivotally mounted on the arm 39 connected to rockshaft 41, by a pivot 106. A cam follower roller 107 is mounted on the lower end of adjusting lever 104, which roller engages the cam 38 that advances and retracts the feed mechanism, as has been previously described in the explanation of the drive train relative to FIG. 3. An adjusting screw 108 is threadedly mounted on an upper portion of the rocker arm 39, and the end of the adjusting screw 108 engages the adjusting lever 104. Manipulation of the adjusting screw 108 changes the position of cam follower roller 107 on the lever 104, relative to the rocker arm 39 that oscillates rockshaft 41, and hence determines the position of the carriages 91 relatively to the inboard lower folding dies D. This is a critical adjustment because it is important that the blank L2 (FIG. 1) be properly positioned relative to the inboard lateral die D1 by the feed mechanism, in order that the side panels 12 will be of equal depth in the folded box.

The feed cam 38 is shaped to provide a dwell period of the feed carriages 91 at both their retracted and advanced positions. The retraction dwell period facilitates insertion of a fresh blank L into the registration station by the operator, and the advance dwell period facilitates gripping of the blank by the upper dies U and U1 at the second folding station, before retraction of the feed carriage.

In order to advance unfolded blanks L from the registration station A to the first folding station B, each carriage 91 is formed with a blank pushing finger 109 (FIG. 4) at the trailing end of the carriage. Mounted at the leading end of each feed carriage 91 is a pusher finger 110. Pusher fingers 110 advance partially folded blanks L1 from the first folding station B to the second folding station C, as previously described. The previously described adjustment of feeder carriage position by screw 108 (FIG. 4) makes it possible to position the carriage 91 and hence the position of pusher fingers 110 relative to inboard lateral die D1, in accordance with the width (depth) of trailing lateral side panel 12. Thus, the fingers 110 stop short of the inboard die D1 by a distance equal to the width of the side panel 12.

As mentioned briefly, means are provided to lower the carriages 91 and their associated pusher fingers 109 and 110, when the carriages have completed a dwell period at the advance part of their stroke, and to raise the pusher fingers again after elapse of a dwell period that occurs when the carriages have returned to their retracted position. Referring principally to FIGS. 4 and 5, and with further reference to FIG. 2, a longitudinal slot 116 is formed in each pusher carriage 91. Disposed along the inner face of each carriage is a longitudinally extending carriage supporting rail 117, having a tongue formed thereon (FIG. 5) that fits in slot 116 in the associated carriage 91. The upper end of the carriage reciprocating arm 92 is connected to the carriage 91, and extends down and over the inner side of rail 117. The carriage 91 and the arm 92 reciprocate horizontally relative to rail 117, and the rail 117 can partake of vertical motion but is horizontally fixed. Depending from each rail 117 are longitudinally spaced fingers 119 and these fingers overlie vertical slots 121 formed in the longitudinally extending lower die D. In order to restrain the rails 117 from horizontal motion while accommodating vertical motion of the rails, blocks 122 are slidably mounted in the vertical slots 121 in the lower die D, and are bolted to fingers 119, depending from the rails, as seen in FIG. 5.

In order to raise blocks 122, and the associated rail 117 along with the carriage 91, lugs 123 (FIG. 5) are bolted to the blocks 122 and these lugs are engaged by lifting pins 124 mounted on the end of laterally extending cranks 126. There are two cranks 126 on each table, a forward crank and a rearward crank. As seen in FIG. 5, the forward cranks 126 are mounted on pivots 127, that project from a block 128 bolted to the associated tables. The forward cranks 126 each have a crank arm 129 supporting a cam follower roller 131, which is operated by a forward feed mechanism lifting cam 132, mounted on each of the camshafts K and K1.

As seen in FIG. 2, the rearward cranks 126 are pivotally mounted between the blocks 78 that mount the bearing blocks 79, for the upper folding dies U, previously described. Rearward crank arms 129 also mount rollers 131 that each engage rearward cams 132 (appearing only in FIG. 2), the rearward cams 132 being identical with forward cams 132. As the camshafts K and K1 rotate, the cam follower rollers 131 on all four crank arms 129 are depressed, causing the lifting pins 124 on the inner ends of the cranks 126 to lift blocks 123, rails 119, and hence the feeder carriages 91. This lifting mechanism does not interfere with reciprocation of the carriages 91, because of the tongue and slot connection between rails 117 and the carriages. In FIG. 4 the feed carriage lifting mechanism is mounted on the far side of lower dies D1 and their extensions 66, and so it does not appear in that figure. The carriages and associated members move to the lowered position under the force of gravity, after the feeding operation or forward reciprocation of the carriages has been completed. The timing of the feed mechanism is given in the timing chart of FIG. 25.

First folding station

As previously mentioned, when the feed carriages 91 advance from their blank receiving positions shown in FIGS. 1 and 4, toward the rear of the machine, pusher fingers 109 moves a blank from the registration station A into position at the first folding station B. Here as seen in FIG. 6 the blank L1 is supported on the longitudinally extending lower folding dies D, the flanges 72 of the side guides 68, and in the case of wide blanks, center support rails 86. Mounted above the lower folding dies D are longitudinally extending upper folding dies U, mounted for pivotal oscillatory motion toward and away from the lower folding dies. The longitudinal extent of the lower dies D, and the upper folding dies U, is at least as great as that of the widest box part that will be formed in the apparatus. The extent of these dies is seen in the plan view of FIG. 2.

As mentioned, and as can be seen in FIG. 6, each longitudinally extending upper folding die U is pivotally mounted. The pivot structure is adjustable to provide precise lateral alignment of the upper and lower dies. To this end, a sleeve 136 is clamped in the bearing block 79, previously described, and a rockpin 137 for the upper dies extends through the sleeve 136 and is eccentric to the periphery of sleeve 136. Rotation of the sleeve 136 in block 79 adjusts the lateral position of the upper dies U relative to the lower dies, whereupon the sleeve is clamped in place in block 79.

Fixed to the ends of rockshaft 137 (FIG. 2) are rocker arms 138 that mount the upper dies U. Referring to FIG. 6, each rocker arm on table T is operated by a cam follower roller 139 bearing against a cam 141 on camshaft K. Although FIG. 6 shows the assembly for table T, the same construction is employed on the other table T1, which mounts camshaft K1. A plate 142 extends laterally outwardly from the rocker arm 138 and mounts a spring 143, the other end of which connects to a spring post 144 projecting from the table T. The spring 143 holds the cam follower roller 139 against the cam 141. The vertical position of the axis of the cam follower roller 139 can also be adjusted by means of an eccentric stud 145 (FIG. 6), which can be clamped in a position in the rocker arm 138 that provides a precisely controlled stroke range of the rocker arm and hence of the upper die U. This also provides adjustment for thickness of the material of the blank.

Overload release means are provided to prevent the upper die U from exerting excess pressure against the lower die D, with damage to the dies. To provide such overload release, studs 146 are threaded into the bearing block 79, and extend freely through bores in block 78 and through bores in the table T. Compression springs 147 are mounted on the lower portions of the studs and are retained by a nut and washer assembly 148. Thus, the spring mounting assembly can give somewhat, under circumstances wherein excess pressure is developed between the upper and lower dies.

Referring again to FIG. 6, the upper die U actually includes a separate die bar 149 mounted on the arms 138 by screws 150. The undersurface of the bar 149 is grooved at 151 to cooperate with a bead 152 formed on the lower die D. When the upper die bar 149 is brought down toward the lower die D, the groove 151 on the upper die, in cooperation with the bead 152 on the lower die causes the end panel 11 and its tabs 13 to bend downwardly against the outer face of the lower die. Since thermoplastic material (such as cellulose acetate) is employed for the blank, an electric resistance heater 153, is mounted in each lower die D, which heats the bead 152 of the lower die, and facilitates the bending of the end panels 11.

It can be seen in FIG. 6 that when the table T is moved laterally along its supporting rods 22 and 23 to adjust for box length, both the upper and lower die assemblies move together so that the alignment of the upper die with the lower die is not affected by lateral adjustment of the table. FIG. 5 shows a clamp block 154 and a clamp bolt 154a which causes the clamp block to be wedged against the cross rod 23 to hold the associated table in its laterally adjusted position. This clamping assembly is supplied for both tables T and T1.

Second folding station

After the longitudinally extending end panels 11 and the tabs 13 connected thereto have been folded down against the outer faces of the lower dies D, the partially folded blank L1 is advanced by the forward pusher fingers 110 to the second folding station, indicated generally at C. Here the laterally extending upper dies U1 and U2 descend sufficiently to grip the blank against the lower dies during folding of the tabs 13, after which the upper dies complete their downward motion to fold down the side panels 12 against the tabs. As previously described, the second folding station includes laterally extending inboard and outboard lower dies D1 and D2, mounted respectively on upwardly projecting anvils 14 and 14a. Laterally extending lower die D1 and anvils 14 are longitudinally fixed on tables T and T1 (FIG. 7) at the inboard side of the second folding station C. The laterally extending lower die D2 and anvils 14a are mounted on the longitudinally adjustable corner blocks J and J1 (FIGS. 2 and 10), at the outboard side of the second folding station C.

The mechanism for operating the inboard upper die U1 at the second folding station C is seen in FIGS. 2 and 7. This mechanism is essentially the same as that for operating the outboard upper die U2, which mechanism appears in FIGS. 13-15. Referring to the inboard mechanism of FIG. 7, a pivot block 156 is bolted to each of tables T and T1 by bolts 156b, the pivot block 156 for table T appearing in FIG. 7. Each inboard pivot block 156, the outboard pivot block 156a (FIG. 10) has a clamp sleeve 156c (FIGS. 7 and 10). The outboard pivot blocks 156a are mounted on the corner blocks J and J1. The structure that operates the inboard upper dies U1 is the same on both tables T and T1, so that the same reference numerals are applied to the various elements of such structure for both tables. As seen in FIG. 7, an eccentric sleeve 157 is adjustably clamped in the clamp sleeve 156c of pivot block 156. A crank 158 mounts the upper die U1 at each table, the crank having a crankpin 158b rotatable in the eccentric sleeve 157. Adjustment of the eccentric sleeve 157 in the clamp sleeve 156c of pivot block 156, provides for proper meeting of the upper and lower dies longitudinally of the machine.

The upper die U1 includes a die bar 159 that is slidably mounted through a suitable aperture in the crank 158, and the die bar 159 is clamped to the crank 158 by a set screw 160 threaded in the crank. With this construction, when the tables T and T1 are laterally adjusted for box length, the set screws need only be loosened one at a time so that the die bar 159 is free to slide through the crank 158 of the table being adjusted. The die bar of upper die U1 is grooved in the manner of the die bars 149 of the longitudinally extending dies U. The groove cooperates with a bead formed on the lower die D1. An electric heater 161 is mounted in the upper die bar 159.

Referring again to FIG. 7, in order to lower or raise the inboard upper die U1 at the second folding station, an adjustable link 164 is pivotally connected to each crank 158 by means of a pin 166. The lower end of each link 164 connects to a bell crank 167 by means of a pin 167B. Bell crank 167 is mounted by means of a pivot pin 168 on a bearing block 169. The stroke range of the upper die U1 is determined by adjusting the length of link 164. Adjustment for blank thickness is provided by the use of an eccentric stud in cam roller 174.

Studs 171 are threaded into bearing block 169 and extend freely through the base of bearing block 156, and through the associated table, which is the table T in FIG. 7. Below the table T, as seen in FIG. 7, are springs 172 retained on the studs 171 by nut and washer assemblies 173. This mounting assembly of the operating mechanism for the upper die U1 provides an overload relief like that of the mounting assembly for the longitudinal upper dies U, previously described.

A cam follower roller 174 is mounted on the outer end of bell crank 167 and engages the upper die operating cam 176 (FIG. 7) mounted on camshaft K. A cam 176 of the same construction (FIG. 2) is also mounted on camshaft K1 on table T1 for operating the linkage at the other end of upper die U1. Each cam follower roller 174 is urged against the associated cam 176 by a construction involving a spring arm 177 fastened to the pivot shaft 168 of bell crank 167 (FIG. 7) and the spring arm 177 is connected to a laterally extending spring 178, the other end of which is connected to bearing block 55, there being one block 55 on each of the tables T and T1 as previously described, as best seen in FIG. 2.

Each cam 176 for operating upper die U1 (FIG. 7), has three lobe or face portions, 176b, 176c and 176d. When the cam follower roller 174 is pressed against lobe portion 176b by spring 178, the upper die U1 is raised (retracted). Lobe portion 176c brings the upper die against the blanks without folding down the associated side panel 12. This prevents the blank from shifting on the lower dies while tabs 13 are being bent by the plunger assembly P. When lobe portion 176d of the cam 176 is turned beneath the roller 174, the die descends further and the associated side panel 12 is folded down through an angle of 90°. The timing of the inboard cams 176 for the inboard upper die U1 is given in the timing chart of FIG. 25.

*The outboard lateral die assembly, the corner block mounting and cam shifter*

The outboard lateral die assembly is functionally the same as the inboard lateral die assembly, but it is somewhat more complicated because it is mounted on the corner blocks J and J1 on tables T and T1, respectively, in order to provide for longitudinal adjustment of the outboard lateral die assembly U2, D2 relative to the inboard lateral die assembly U1, D1. As seen in FIGS. 2, 10 and other figures, the tables T and T1 are formed with longitudinally extending slots 170 and 170a. The purpose of these slots is to accommodate longitudinal motion of the mounting means provided for corner blocks J and J1 along their respective tables, to adjust for the width of the box lid being made. The shifting of the corner blocks J and J1 by means of hand wheel 25d (FIG. 2), has been previously described.

The adjustable mountings for the corner blocks J and J1 will now be described with reference to FIGS. 9A and 12. The mounting of both corner blocks is the same, but it will be noted that the assembly shown in FIG. 9A includes corner block J on table T, whereas that of FIG. 12 (which is a section looking from the opposite direction from FIG. 9A) includes corner block J1 on table T1. In FIGS. 9A and 12, bell cranks 167a for operating the outboard lateral upper die U2, and the bearing blocks 169a that mount the bell cranks 167a appear, although the bell cranks 167a are broken away. The bell cranks 167a are like the bell cranks 167 (FIG. 7) for the inboard lateral die U1.

The bearing blocks 169a are mounted for overload release by means of studs 171a and springs 172a in the manner described for the bearing blocks 169 of the corresponding inboard assembly. The studs 171a extend through the slots 170 and 170a formed in the tables T and T1. There is a block 175 below each table through which the studs 171a just described freely extend. A key 175a fits in the slot 170, and a specially shaped clamp nut 175c (FIG. 12), and a clamp bolt 175d, are also part of the assembly, seen in FIG. 14, the specially formed clamp nut 175c is drawn against a shoulder on the table by the clamp bolt 175d to lock the corner block J1 in its adjusted position on the table. This structure is like that described in the aforesaid Crathern et al. application and forms no part of the present invention.

A cam set shifter is mounted on each corner block for moving the set of cams associated at the corner blocks. The cam set shifting structure is best seen in FIGS. 12, 13 and 14. A laterally outwardly projecting finger 175e is mounted on its associated corner block, corner block J1 in FIG. 12, and corner block J in FIGS. 13 and 14. A groove 175f is formed in the hub of a cam 196a that operates a tuck plate, the function of which cam will be explained presently. The groove receives the cam set shifting finger 175e. The set of cams associated with each corner block, some of which have not been described in detail, comprise a cam 176a that operates the outboard upper folding dies U2, the tuck plate cam 196a just referred to, that operates an outboard tuck plate 186a (FIGS. 4 and 11) to be described in detail presently, and a cam 226a (FIGS. 13 and 14) that operates one of the outboard solvent applicator and tab folder mechanisms P1 (FIG. 13) also to be described presently. Each set of three cams is keyed to the camshafts K or K1, as the case may be, by keys 175g (FIGS. 9A and 12). The cams of each set are held together for simultaneous movement by a longitudinal bolt 175h extending through all of the cams. The bolt is shown sectioned in FIGS. 9A and 12, and its length appears in dotted lines in FIG. 13. The cam shifter structure just described also appears in the aforesaid Crathern et al. application, and is not part of the present invention.

The structure and operation of the mechanism for raising and lowering the outboard laterally extending upper die U2 is like that previously described for operating the corresponding inboard die U1, so that the reference characters employed for the inboard assembly have been applied to the outboard assembly, with the suffix "a" added. The cam 176a that operates the outboard lateral die U2 appears in FIGS. 13–15. The bell crank 167a operated by each cam 176a has been broken away in FIGS. 9A, 12 and 13, but appears in full in FIG. 15. The contour of the outboard cams 176a for operating the outboard lateral dies U2 is like the contour of the cam 176 (FIG. 7) for operating the inboard upper dies U1, but the timing of cams 176 and 176a is not the same for reasons now to be explained.

When thermoplastic material such as cellulose acetate is employed as the material of the box part, such material can be stretched and distorted, if attempts are made to fold the two opposed side panels 12 at once. This is particularly true where, as in the present case, the end panels 11 have been previously folded down. For this reason, the timing of the inboard and outboard upper fold dies U1 and U2 by cams 176 (FIG. 7) and 176a (FIG. 15), respectively, is such that one upper die (the outboard die, U2 in this case) engages its side panel 12 to hold it during bending of the end panel tabs, and then continues down to fold the associated side panel 12, slightly ahead of the corresponding motions of the other upper die (the inboard die U1 in this case). Thus, any drawing or creeping of the material that takes place on the first gripping and lateral fold does not interfere with the action on the material that takes place during the second gripping and the subsequent formation of the second lateral fold. Furthermore, the upper die (U2) that first descends upon, and grips the blank, while the other upper die (U1) descends upon and grips the blank. This provides precise vertical location of the blank during the tab bending operation. Actual bending of the side panels then proceeds. As mentioned, and as can be seen from the timing chart of FIG. 25, the outboard lateral die U2 starts down to grip the blank by about 10° of camshaft rotation before the inboard die starts down to grip the blank. The same is true of the folding operations that follow the tab bending steps, except that die U2 leads die U1 by about 6 degrees. As can be seen from the timing diagram of FIG. 25 the feed mechanism does not start its back or retract stroke until the outboard die U2 has engaged the blank. Thus the feed mechanism can be lowered to clear the inboard laterally extending die U1, before the latter die reaches is lowermost position, and such lowering and clearing of the pusher finger 110 from the blank will not upset the placement of the blank on the lateral dies U1 and U2, because the blank is held by the previously lowered outboard die U2, which grips the blank before the pusher finger 110 is retracted.

*Blank guide mechanism at the outboard lower die*

As seen in FIG. 2, near the center of the machine is a relatively long finger 179 that projects forwardly from adjacent the lower die D2 to guide the center of the blank, which might be sagging, to the final blank guiding means. As seen in FIG. 11, near the ends of the lower die D2, spring fingers 180 are mounted on blocks 180a screwed to the anvil 14a, and such fingers insure that the edge of the blank will not catch on the bead 163a of the die D2. The spring fingers can be deflected by the upper die and thus will not interfere with the folding operation.

*Inboard tuck Plate*

The longitudinal extending lower dies D must be spaced from the inboard laterally extending lower die D1 at the second folding station to prevent interference with the trailing side panel 12 of the blank L2, when panel 12 is folded down over the inboard laterally extending lower folding die D1. To bridge the gap between dies D and D1 during feeding of the blank from the first to the second folding station, inboard movable tuck plates 186 (FIG. 4) are provided, which tuck plates can be retracted to clear the trailing side panel 12 when the latter is folded down. The inboard tuck plates further serve to press the edges of the associated side panels 12 against the tabs 13 on the end panels 11, after the tabs have received solvent and have bent around the associated anvils 14, and after the side panels 12 have been folded down by the upper die U1 at the second folding station. Outboard tuck plate assemblies are also provided, and these tuck plates (FIG. 11) initially guide the leading side panel 12 during feed, and also provide the aforesaid pressing action of the leading side panel 12 against the tabs 13 on the associated end panel 11, backed up by the associated anvils 14a.

The mechanism for operating one of the inboard tuck plates 186 appears in FIGS. 2, 4 and 8. The tuck plate is a thin vertical plate. As best seen in FIG. 4, in its advanced position each tuck plate 186 has an upper edge that is in alignment with the upper edges of dies D and D1. Each tuck plate 186 is mounted on a bracket 187, fastened to a rock shaft 188 (FIG. 8) that extends across the associated table T or T1, as the case may be, and turns in the flanges of the associated table. On the laterally outer end of the rockshaft 188 is a generally horizontal crank arm 189, the counterpart of which, crank arm 189a for the outboard tuck plate assembly appears clearly in FIG. 14.

Extending upwardly from the outer end of the crank arm 189 (FIG. 8) is an adjustable link 191 which is pivoted at its upper end to a cam follower arm 192. The cam follower arm 192 is mounted on a pivot pin 193 fixed in a support block 194 fastened to the table T. Throughout this discussion of the inboard tuck plate mechanism, it should be understood that the inboard tuck plate mechanisms on both tables T and T1 are the same, so that only one will be described. Block 194 is retained on the associated table T or T1, by bolts 194a which have been broken away in FIG. 8, but which are threaded into another block to be described presently (FIG. 9) as forming part of the mounting of the corner folding mechanism.

Near the outer end of cam follower arm 192, is a roller 195 (FIG. 8) that engages a cam 196 for operating the inboard tuck plate mechanism in the predetermined timed relation to the other parts. In order to hold the cam roller 195 against the associated cam 196, a spring arm 197 (FIGS. 4 and 8) depends from the rockshaft 188, and a generally horizontal spring 198 connects between spring arm 197 on rockshaft 188 and a spring post 199 (FIG. 8) that projects outwardly from the inner side flange of the table T. As indicated in dotted lines in FIG. 4, and as seen in FIG. 8, the outer face of each longitudinal die D is recessed at 200 to receive the inboard tuck plate 186 in its retracted position.

The inboard tuck plate cams 196 (FIG. 8), and the outboard tuck plate cams 196a (FIG. 9A) are three stage cams. Referring to FIG. 8, which shows an inboard assembly, when a large radius lobe 196a of the inboard cam 196 is over the cam follower roller 195, the tuck plate 186 is fully retracted against the force of spring 198, to clear the trailing side panel 12 of the blank (not seen in the figure) during bending of tab 13 on the end panel 11 and during the folding down of the trailing side panel 12 at the die set U1, D1. When a reduced radius cam surface or lobe 196e is over the roller 195, the tuck plate can be advanced, and spring 198 causes the tuck plate 186 to press the side panel 12 against the tab 13 on the end panel 11, backed up by anvil 14. It is understood that the associated tab 13 will have received solvent, and will have been folded by the corner mechanism P, to be described presently. A small hump 196f of the tuck plate cam 196 then passes over the roller 195, with which a cam surface 196g, of slightly greater radius than that of cam section 196e, is over the roller. The inboard tuck plate 186 is now retracted slightly to clear the work. However, the tuck plate stays in this slightly retracted position during the initial lifting of the completed box part and thereafter serves as a guide during feeding of the next blank to the second folding station, as previously described.

Retractable means are provided to guide the midportion of the blank as it passes from the longitudinal lower dies D to the inboard lateral lower die D1. As seen in FIGS. 4 and 8, at each inboard tuck mechanism is a vertical arm 201 extending upward from an extension 201a fastened to the inner end of rockshaft 188 that operates the inboard tuck mechanism. Connected across the upper ends of arms 201 is a blank deflecting strip 202, which is in its upper position when the tuck plates are in their upper guiding position, and which is retracted with the inboard tuck plates 186 to clear the trailing side panel 12 during the folding operation. Strip 202 is clamped to arms 201 by clamp 202a in order to provide for lateral adjustment of the tables.

To additionally guide blanks and their panels as the leading edges move from lower die D1 to lower die D2, side plates 204 are provided between the lateral ends of these dies, these plates appearing in FIGS. 2 and 4. The side plates 204 are mounted on posts 205 and are spaced from anvil 14 by blocks 205a. The side plates 204 also prevent the previously folded longitudinal end panels 11 from buckling inward and hanging up on other parts. When the outboard dies are adjusted for box width, new side plates 204 of the proper length are installed.

*Outboard tuck plates*

Outboard tuck plates 186a are also provided, which tuck plates generally serve the same function as that of the inboard tuck plates 186, but which are mounted on the outboard side of lower dies D2. The outboard tuck plates 186a appear in FIGS. 4, 9A and 11. The outboard tuck plate assemblies are mounted on the corner blocks J and J1 at each side of the apparatus, and the linkage for the plates is such as to pivot them in the opposite direction from that of the inboard tuck plates. These plates are driven by cams 196a, FIG. 9A. However, the function and mode of operation of the mechanism for operating the outboard tuck plates is functionally like that described in connection with the inboard tuck plates. Therefore, the parts of the outboard assemblies have the same reference numerals as those applied to the inboard assemblies, with the suffix "a" added to the reference numerals applied to the parts of the outboard tuck plate assemblies.

There are a few differences between the outboard and the inboard tuck plate assemblies. For example, as seen in FIG. 4, the direction of motion of the outboard tuck plates 186a is opposite to that of the inboard tuck plates 186. Also, the cross shafts 188 for the inboard assemblies (FIG. 8) are mounted in the tables T or T1, whereas the cross shafts 188a for the outboard tuck plates 186a (FIG. 9A) are journalled in the associated corner blocks J or J1, so that they move with the corner blocks upon adjustment of the outboard dies D2 and U2 for box width. Furthermore, the mounting of the springs 198a (FIG. 4) that press the outboard tuck plates 186a against the side panels 12, are somewhat modified in the outboard units. In the outboard assemblies, the fixed ends of the springs 198a are mounted on spring posts 199a, that depend from corner blocks J and J1, whereas the springs 198 for the inboard assemblies are anchored to the tables. The timing of the outboard tuck plates by cams 196a (FIG. 9A) is given in the timing chart of FIG. 25. The outboard tuck plates 186a lead the inboard tuck plates 186 by a few rotational degrees of their camshafts.

*The solvent applicator and tab folding mechanism*

There is an inboard solvent applicator and tab folding mechanism P associated with each end of the inboard lateral die D1 and mounted on tables T and T1, and an outboard mechanism P1 of the same construction, mounted on each of the corner blocks J and J1, and operating in conjunction with the outboard lateral die D2. Both sets of mechanisms P and P1 appear in plan in FIG. 2. The inboard mechanism P is seen in side elevation in FIG. 9, whereas the outboard mechanism P1 is seen in FIGS. 10 and 13 to 19. Since the construction and mode of operation of both the inboard and outboard mechanisms are the same, the reference numerals that are applied to the inboard mechanism P will also be applied to the outboard mechanism P1, with the suffix "a" added, except where parts are duplicates. The following description generally refers to the outboard mechanism, although several of the figures (as previously mentioned) show the inboard mechanism and hence have the suffix "a" appended to the corresponding reference numerals. It will be noted that some of the parts of the inboard and outboard corner mechanisms on the same table are reversed, right to left, whereas other parts of the assemblies are all the same.

The corner mechanisms operate in two stages, and are spring advanced and cam retracted. In each mechanism, there is a swinging head or gripper block that presses one marginal edge of an end panel 11 against an anvil 14 or 14a, and a tab folder plunger that applies solvent to the associated tab and continues to advance and bend the tab through a angle of 90°, to bring the tab against the laterally extending wall of the associated anvil. Referring to FIG. 10, which shows one of of the outboard corner assemblies P1, the pivot block 156a, which pivotally supports the upper die U2 (not shown) in clamp sleeve 156c, projects upwardly from the associated corner block J. A similar pivot block 156a, but reversed right to left, is mounted on the opposite corner block J1 on table T1. Each outboard pivot block 156a has a laterally projecting leg 207a. In order to mount the corner folding units, a head is provided having a longitudinally extending forked arm 208a, that is pivotally mounted on the leg 207a of block 156a, by means of an adjustable eccentric pivot pin 210. As seen in FIG. 16, each pin 210 has an eccentric portion 211 fitted in leg 207a, and spaced pin portions 212, that fit in bushings 213 (FIG. 10) in forked arm 208a.

Secured to the forked pivot arm 208a by screws or bolts 209 (FIG. 16), is an end panel gripper block 215a, which is recessed to receive a T-shaped solvent applicator and tab folder plunger 214a. The portion of the plunger 214a that faces the associated anvil 14a is fitted with a sintered bronze applicator strip 216a, to be described in more detail presently. The anvils 14a are provided with replaceable bevel faced shoes 218a, which shoes carry electric heater elements 220.

The T-shaped plungers, such as the plunger 214a being described, have the dual function of applying solvent to the associated corner tab 13, and bending the tab 90° around the corner of the associated anvil. The plungers 214a of each assembly P1, and their counterparts 214 in the inboard assemblies P, are actually of left and right construction, although the parts of diagonally opposite assemblies are alike. The plungers 214, 214a can move relatively to their associated panel gripper blocks, such as the block 215a under description, and illustrated in FIG. 10 of the drawings.

As seen in FIGS. 16 and 17, the panel gripper block 215a has a horizontal recess 222a formed therein, which recess receives the horizontal stem or shank 224a of the combined solvent applicator and tab folding T-shaped plunger 214a. Each plunger 214a is held in its retracted position in the block 215a by a spring 227, that connects between a post 228 in a spring receiving recess formed in the shank 224a, and a post 230 that is mounted in the forked pivot arm 208a. The crossbar 231a of the T-shaped folder and applicator plunger 214a is vertical, and normally rests in a recess in block 215a that has a vertical wall 232a, which wall determines the retracted position of the plunger 214a.

The two inboard corner plunger assemblies are operated by cams 226 (FIG. 9), whereas the two outboard assemblies are operated by cams 226a (FIGS. 10 and 13). The corner plunger assemblies are spring advanced, and cam retracted. They are advanced by springs 240 (FIGS. 9 and 10) the upper ends of which bear against washers 242 that are backed up by the tables T or T1, as the case may be. The lower end of each spring 240 engages a nut and washer assembly 244 which is adjustably mounted on a draw rod 246. The upper end of each draw rod 246 is pinned at 248 to a double bell crank lever 250 or 250a. In the outboard assembly (FIGS. 10 and 13), the double bell crank levers 250a are mounted on a pivot block 252a, which blocks are bolted to the corner blocks J or J1 for the outboard mountings (FIG. 10), or the corresponding pivot blocks 252 are fixed to blocks 254 (FIG. 9), that are mounted on tables T and T1 in the inboard mountings.

As seen in FIG. 10, the double bell crank lever 250a has an upwardly projecting arm 256a, which makes a ball joint connection 257 with the outer end of an adjustable length horizontal link 258. The inner end of the link 258 makes a ball joint connection 260 with the shank or stern 224a of the T-shaped tab folder plunger 214a. The plunger and gripper block assembly is retracted by a cam follower roller 262a (FIG. 10) on the outer end of the double bell crank lever 250a, the roller being pressed against cam 226a by the spring 240. As previously described, in the outboard assemblies, cam 226a is one of a set of cams that is slidably along cam shaft K or K1, see FIGS. 13 and 14.

As seen in the plan views of FIGS. 16, 18 and 19, the forward face 264a of the outboard plunger 214a is inclined at an acute angle relative to the forward face 265a of the gripper block 215a. As seen in FIG. 16, the face 265a of the gripper block 215a is parallel to the planar face 266a of the shoe 218a of the anvil 14a, when the face 265a engages an end panel 11. This results from the geometry of the assembly. The forward face 265a of the gripper block 215a will just engage and press an end panel 11 against the face 266a of the anvil shoe 218a, before the T-shaped plunger 214a is moved forwardly from its fully retracted or seated position in the gripper block. Link 258 is adjusted so that the gripper block releases the end panel before the side panel forming commences.

FIG. 13 shows in plan the entire mechanism in its fully retracted position, with which the near corner of the face 264a of the plunger 214a is substantially flush with the forward face 265a of the gripper block 215a. As best seen in FIG. 19, the forward face 264a of the plunger 214a is inclined to the near side face "s" of the plunger by an angle greater than 90°, the actual angle selected being 94° in the production machine. In other words, plunger face 264a is inclined by an acute angle of 4° from the plane of the forward face 265a of the gripper block 215a.

The cycle of operation of one of the corner plunger assemblies will now be described in connection with FIGS. 10, 13, 16, 18 and 19, after which the system for supplying solvent to the sintered bronze strips 216 and 216a will be explained in detail. In FIG. 16 the corner mechanism has been advanced by the spring 240, under control of the cam 226a and the associated link assembly to the point in the operation at which the forward face 265a of the gripper block 215a engages the margin of the associated end panel 11 of the blank, and presses it against the associated anvil 14a. The blank does not receive the force of spring 240, because the link 258 is not connected to the gripper block 215a, but rather the link connects to the T-shaped plunger 214a, and the plunger connects to the gripper block through spring 227.

Just before the parts reach the position shown in FIG. 16, the sintered bronze applicator strip 216a will have engaged the associated tab 13 of the blank, and during the final approach of the forward face 265a of the gripper block 215a to the anvil 14a, the tab 13 receives solvent from the sintered bronze strip 216a. The forward face of the sintered bronze strip 216a is parallel to the forward face 264a of the T-shaped plunger, and hence is also inclined. Thus during the period of solvent application, there is a stage when the tab 13 is bent slightly and is fully engaged by the forward face of the sintered bronze strip.

By the time the plunger assembly reaches the position of FIG. 16, solvent application will be complete. Further forward motion of the panel gripper block 215a is now prevented, so that further advance of the link 258 by the spring 240, under control of the cam 226a, unseats the T-shaped plunger 214a and causes it to continue advancing. This stretches spring 227 and holds the gripper block 215a against panel 11 of the blank.

The eccentric pivot pin 210 for the swinging arm 208a will have been adjusted so that the near face "s" of the T-shaped plunger 214a will be spaced from the opposed face "t" of the anvil shoe 218a by the thickness of the tab 13. Thus as the spring 240 continues to advance the T-shaped plunger 214a, the corner of the tab 13 is trapped between the face "s" of the plunger, and the face "t" of the anvil shoe, so that the tab is quickly bent through an angle of 90°, to bring the tab against the face "t" of the anvil shoe. This action takes place while the plunger 214a advances but a small distance from the position shown in FIG. 16, to that shown in FIG. 18. It can be seen that this precise bending action provides a square corner, and is accomplished without interfering with the zone of the tab 13 that has received solvent from the sintered bronze strip 216a.

Continued rotation of the cam 226a first reseats the T-shaped plunger 214a against face 232a in the gripper block, after which the entire corner assembly is retracted, as seen in FIGS. 13 and 19.

The upper outboard folding die U2, which has been gripping the blank, now completes its descent as previously described, to fold down the side panel 12, with the margins of the panel engaging the solvent coated faces of tabs 13. As seen in FIG. 19, the outboard tuck plate 186a, which will have been retracted, is now raised under control of cam 196a (FIG. 9A) by spring 198a (FIG. 4), to press the margin of the side panel 12 against the solvent coated tab 13. This pressure by the tuck plate 186a, coupled with the heat applied to the anvil shoe by the electric heater 220, completes the seal, or at least sets it up sufficiently to permit removal of the box by the elevator mechanism. The tuck plate presses against the corner of the blank for about ⅓ turn of the camshaft. As has been described in connection with the operation of the tuck plates, before the box is removed by the elevator mechanism, the tuck plate 186a is retracted slightly out of contact with the side panel 12 of the blank, under control of lobe 196g of cam 196a, FIG. 9A. The timing of the parts just described is given in the timing chart of FIGURE 25.

*The solvent applicator system*

The solvent applicator system has a number of features. It is simple, requires no solvent distribution or scavenging pumps, it is readily adjustable for the depth (width) of the side panels of the box being manufactured, and it uses a minimum of solvent for the sealing process.

Referring to FIG. 20, the solvent is supplied from a solvent drip bottle 270 having a spout 272 threaded on the neck of the bottle, and sealed by gasket 273. The bottle spout 272 terminates in a nipple 274 having a beveled end. The bottle and spout are mounted in an inverted position in a body 275, which has a bore 275a that loosely receives the nipple 274. The lower end of the body 275 is internally threaded at 276 to receive a cap 278, a porous filter 280 is fitted between the end of the bottle spout nipple 274 and the upper face of the cap 278.

The cap 278 has a bore 282, and projecting downwardly from the cap is a nipple 284, to which a solvent conducting hose 286 is connected. In order to adjustably mount the entire drip bottle assembly just described, on the machine, an adjusting rod 288 projects laterally from the body 275, and has a vertical bore 290 for receiving a vertically extending post 292. Post 292 is mounted on a mounting block 294, which is secured to one of the tables T or T1 for the inboard assemblies, and to the associated corner blocks J or J1 (not shown in FIG. 20) at the outboard assemblies.

The vertical position of the drip bottle assembly on the post 292 can be quickly adjusted by sliding the drip bottle assembly up or down on the post 292. The assembly is frictionally maintained in the adjusted position by means of a collar 296 surrounding the adjusting rod 288, which collar is spring loaded by a spring 298.

Each of the T-shaped plungers 214 (or 214a) is supplied with solvent in the following manner: A transverse port 300 is formed in the vertical crossbar 231 of the plunger, near the lower end of the bar, and port 300 communicates with a vertical fluid passage 302 formed in the vertical crossbar. The upper end of vertical passage 302 communicates with a horizontal port 304. Port 304 communicates with a recess 306 which opens into the upper end of a vertical groove or slot 308 (see also FIG. 21) that receives the sintered bronze solvent applicator strip 216.

In accordance with the present invention, the density of the porous bronze solvent applicator strip 216 increases progressively from the top of the strip to the bottom of the strip. It has been found that with this construction, no scavenging of solvent from the lower end of the plunger is required. The combined effects of the static head at line X—X in FIG. 20 established by the positioning of the drip bottle assembly, and the capillary action that occurs in the variable density porous sintered bronze strip 216, provides a substantially uniform distribution of solvent in the applicator strip along its length. By adjusting the height of the static head indicated by line X—X in FIG. 20 relative to the plunger 214, the solvent applicator system can be operated without appreciable drip of solvent from the bottom of the strip 216. In fact, in case the side and end panels of the box part are narrow, the static head can be reduced by lowering the drip bottle assembly, so that a reduced quantity of solvent reaches the bottom of the strip. Conversely, for wide side and end panel boxes the drip bottle assembly will be raised, to elevate the level of the static head (line X—X of FIG. 20) so that solvent will be drawn down by capillary action along the entire vertical extent of the sintered bronze strip 216, while minimizing the dripping of solvent out of the bottom of the strip.

The manner in which a solvent applicator strip 216 (or 216a) of variable density is provided can be explained in connection with FIGS. 21 and 21A. Referring to FIG. 21, which is a composite figure, the slot or groove 308 at the forward face 264 of the plunger 214, has a constant width, indicated at "w." Similarly, the width "w1" of the porous bronze applicator strip 216 is constant along its length, but the width "w1" of the strip is slightly greater than the width "w" of the slot 308, in order to provide for a light press fit of these parts.

However, as indicated in FIG. 21A, the applicator strip 216 is not of uniform thickness or depth. After the applicator strip has been formed in accordance with the usual powder metallurgy techniques, it will be wedge shaped as viewed from its side, so that the front face 309 of the strip diverges from the rear face 310. Thus the thickness "t" at the upper end of the strip, will be less than the thickness "t2" at the bottom of the strip. With a strip and plunger assembly having a length "L" in the order of 3½" thickness "t" will be about 0.118 inch, and thickness "t2" will be approximately 0.20 inch greater than the thickness "t" of the strip, or 0.138 inch. With a strip thickness "t" of about 0.118 inch, the depth of the slot 308 in the plunger will be about 0.110 inch, so that the smaller or upper thickness "t" of the bronze strip exceeds the depth of the slot 308 in the plunger 216 by about 0.008 inch.

The bronze powder forming the starting material for the strip is of about 5-micron mesh.

On assembling of the parts, the plunger 214 is placed in a press, with its front face 264 (or 264a), accurately aligned with the front face of the die on the press ram. A sintered bronze strip 216 is then initially pressed into place in the groove 308 of the plunger, and the stroke of the ram is continued until the outer or front face 309 of the strip 216 is parallel to the front face 264 (or 264a) of the plunger. This uniform compacting of the sintered bronze material forming the strip, produces the variable density effect, with the accompanying desirable characteristics in the dispensing of the solvent previously referred to.

As mentioned, the sintered bronze strip 216 will be produced in accordance with conventional powder metallurgy techniques that form no part of the invention. The processes usually include an initial compacting and shaping of the bronze powder under high pressure in a press, followed by a sintering of the resulting compacted strip in a controlled atmosphere furnace. In case of excess deformation of the strip during the sintering process, a final shaping, machining, or coining operation can be performed to accurately size the part.

As to the solvent employed in the solvent applicator system, the solvent should be nontoxic, it should have a relatively high vapor pressure, and should soften the material of the blanks without rapidly dissolving the material. The solvent should also leave the material chemically unchanged after it has evaporated. In case the blanks are formed of cellulose acetate sheet, a solvent having these properties is known to the trade as "Methyl Cellusolve," supplied by the Union Carbide & Chemicals Corporaton. The approved chemical name for this material is 2-methoxy-ethanol.

*Blank stops*

Stop means are provided for the leading edges of tabs 13 on end panels 11 of the blank at the first folding station D. These stops are in the form of small blocks 310 (FIGS. 2 and 6), slidably mounted on the narrow flanges 72 of side guides 68 and held in place by thumb screws 312 (FIG. 6). The thumb screws deform the blocks to grip the side guides. These stops prevent overfeed by pusher fingers 109. Also, where the box lids are narrow, that is, have a short longitudinal dimension in the machine, these stops will square the blank in case the side guides 68 have not maintained perfect blank orientation.

Stop assembly 314, FIG. 11, is also provided for the leading edge of leading side panel 12 at the rear of the machine. These stops are constructed so as to be readily adjustable for the width of the leading lateral flap 12. The stops are self-clearing, as the movable upper die U2 descends to bend down box lids having narrow lateral flaps. These adjustable blank stop assemblies 314 are supported by blocks 316. A carrier 318 is movably mounted in each block 316 and the carrier also rotatably mounts an adjusting screw 319. A quick release nut assembly 320 is provided for quick adjustment of the screw and the carrier 318. The fine adjustment of the carrier 318 is made by rotating the adjusting screw 319. A blank stop plate 321 is mounted for vertical sliding motion on the carrier 318 by means of a spring loaded plunger 322. The upper end of the plunger 322 has a rounded nose that can be engaged by the lower face of a cam 324 mounted on the crank arm 158a for the outboard upper die U2. This prevents interference with the upper die in case shallow boxes are being produced. In the position of the parts shown in FIG. 11, the stop plate 321 projects above the outboard tuck plate 186a, so that the tuck plate will guide the flap 12 of the blank toward the stop plate. The stop structure 314 of FIG. 11 is described more fully in the aforesaid Crathern et al. application, and is not part of the present invention.

*Blank elevator mechanism*

The blank elevator mechanism has been briefly described, but certain details of the design and construction of the parts, not heretofore mentioned, will not be explained. The essential elements of the mechanism appear in FIG 22.

The inboard vacuum cups 15 of the elevator mechanism are supported by uprights 330, which are mounted directly on pivot blocks 156, and so partake only of lateral (box length) adjustment motion. The outboard elevator vacuum cups are supported by uprights 330a, and these are mounted on the pivot blocks 156a previously described. Thus uprights 330a will partake of lateral (box length), and longitudinal (box width) adjustment motion. In order to mount the outer sheath of the flexible cable 60 at each corner of the second folding station, brackets 332 project diagonally inwardly from the uprights 330 and 330a and the associated ends of the cable sheaths are adjustably mounted in these brackets.

A flexible push-pull remotely controlled type cable 60 that has been found suitable for the application being described, is the flexible race ball-bearing push-pull type cable sold under the name of "Controlex," and manufactured by the Controlex Corporation of America, White Plains, New York.

The remote movable end fittings 334 of each cable 60 are connected to the vacuum cups 15 in a conventional manner. The ends of the sheaths of the four cables 60 at their driven ends are fitted in a clamp block 336 mounted outside of the rear end of the machine. The driven end fittings 338 of the cable are adjustably secured in a connector 340 which has a lug that is pivotally mounted in the upper end of a generally vertical link 342. The lower end of the link 342 is pivotally connected to the cable operating lever 59 that is controlled by the cam 58, as previously described. The cam 58 operates the lever 59 by means of a cam follower roller 59b, the design being such that the spring 59a, also previously referred to, lifts lever 59 and hence lowers the vacuum cups against the completed box parts. The cam 58 lowers the lever 59 and hence raises the vacuum cups to remove a box part from the dies. The spring lowering of the vacuum cups 15 protects the latter from damage.

Vacuum for each of the vacuum cups 15 is supplied through a manifold block 344 (FIG. 22) which receives a vacuum line 346, that connects to the vacuum valve 65 previously referred to. The vacuum line 346 is broken off at the manifold 344, and no hoses are shown connected to valve 65 in FIG. 22. The vacuum lines to three of the vacuum cups 15 have also been broken away in FIG. 22, and only one vacuum hose is shown at manifold 344 in the figure.

Referring to the simplified diagram of FIG. 24, the elevator vacuum system includes a vacuum line 348 leading from the vacuum pump 64 to the valve 65. An elevator vacuum release port 350 is provided at the valve. Valve 65 is of conventional design, and is shown only schematically in FIG. 24. Also the manifold 344, FIG. 22, is omitted from FIG. 24 for clarity. With the valve operating cam 65a in the position shown in FIG. 24, the spool of the vacuum valve 65 is in its "out" position. This connects the line 346 (previously referred to) leading to the elevator vacuum cups 15, to the vacuum supply line 348, so that the elevator vacuum cups 15 can grip and lift the completed box part clear of the dies at the second folding station B.

As to the valving of the ejector mechanism E, as previously mentioned, the vacuum cups 57 and 57a of the ejector mechanism will have been moved forward in the apparatus and will be above the completed box L2, ready to receive the box as the elevator vacuum cups 15 raise the box against the ejector vacuum cups 57, 57a. During motion of the spool of valve 65 from its "out" to its "in" position, there is a vacuum connection to both the elevator and ejector vacuum cups. This is provided by laps in the spool of the vacuum valve 65. Lapped valves of this type are well known in the art, so that a detailed description thereof is unnecessary. After the box part has been gripped by the ejector vacuum cups, the cam 65a will have moved the vacuum valve to its "in" position, with which the elevator vacuum cups 15 release their hold on the box part, and the ejector vacuum cups 57 and 57a now support the box, ready for the ejection operation.

*The ejector mechanism*

The ejector mechanism appears in the diagrammatic perspective of FIG. 22, and in the fragmentary side elevation of FIG. 23. In FIG. 22, the ejector vacuum cups 57 and 57a are shown in their forward position, ready to receive the completed box L2.

The ejector mechanism is supported on the rear crossbar 21a of the frame by an angle bracket 360, which bracket has an upright 362 and a lateral arm 364. This construction clears the rails 15a that receive the completed box part, and centers the vacuum cups 57 and 57a of the ejector mechanism at the midplane of the machine. In order to slidingly support the ejector vacuum cups, upper and lower carrier rods 366 and 368 project forwardly from a mounting block 370, fixed to the end of the arm 364 of the mounting bracket 360. As best seen in FIG. 23, the outer, or forward ends of the carrier rods 366 and 368 are connected by a combined spacer and limit stop block 372. Slidingly mounted on the carrier rods 366, 368 is an ejector carrier or carriage 374. The carriage has a bore 376 (FIG. 3) that receives the lower rod 368, and a fork 378 that slides along the upper rod 366. Projecting rearwardly from the carrier 374, are posts 380 provided for mounting the rearward ejector vacuum cup 57. In order to mount the vacuum cup 57, a block 382 is slidably mounted on posts 380, and the block can be adjusted and maintained in any desired position (as determined by the box width), by a set screw 384. Depending from the block 382 is a vacuum cup mounting block 386, which mounts a horizontal tube 388. The tube 388 is slidable in the block 386, and the tube is maintained in its adjusted position by a set screw 390. These horizontal adjustments facilitate handling a large range of box sizes.

A forward vacuum cup 57a is mounted on an externally threaded cup adapter 392, which has a threaded nipple 394 that mounts the adapter on the carrier block 374. The external threads 396 on the cup adapter 392 mount a spring 398, which can be threadedly adjusted along the cup adapter 392 to engage the box part outside of the forward vacuum 57a with a predetermined force. With this construction, the spring 398 offers more resistance to deflection than does the forward vacuum cup 57a. Consequently, when the vacuum is released from the ejector vacuum cups, the spring 398 tends to break the completed box clear of the forward vacuum cup 57a, which in turn expedites release of the box from the rearward vacuum cup 57.

The vacuum connections to the vacuum cups 57 and 57a are provided by a flexible hose 400, which is mounted on the carrier 374, and which provides a vacuum connection to the rearward vacuum cup 57 by means of a bore 402 (FIG. 23) in the carrier. Bore 402 intersects a bore 404, which in turn connects by a flexible hose 406 to the tube 388 previously referred to, for providing the vacuum connection to the rearward vacuum cup 57. The bore 404 in carrier block 374 also connects to a bore 408 in the adapter 392 that mounts the forward vacuum cup 57a.

The carirer 374 is moved as follows: The springs 63a, which surround the lower carrier rod 368, move the ejector carrier 374 (and the vacuum cups) in the forward direction, that is, in the direction wherein the carrier abuts the limit block 372, and is ready to receive a box from the elevator assembly.

As previously mentioned, the carrier 374 is positively moved in the rearward direction, to carry the box clear of the second folding station, by means of cam 61 (FIG. 22), which engages a cam follower roller 61a on the cam follower lever 62, previously referred to. As has been previously described, the end of lever 62 is connected to a cable 63, that connects to the carrier 374. As seen in FIG. 22, the cable 63 runs from the end of lever 62, passes over pulleys 410, 412 and 414 and extends forwardly to connect to the vacuum cup carrier 374.

FIG. 24 also shows the schematic diagram of the vacuum system for the ejector, as associated with the vacuum valve 65 and its cam 65a. When the vacuum valve is in its "out" position, as illustrated in FIG. 24, a vacuum line 416 leading from the vacuum pump 64, is blocked off by the valve spool, and the line 400, previously described, that leads to the carrier 374 (the carrier is not shown in the diagram of FIG. 24) is connected to an exhaust line 418. This is the condition with which the ejector mechanism is disposed over the rails 15a, to drop the completed box onto those rails.

When the cam 65a is rotated to place the vacuum valve 65 in its "in" position, vacuum cups 57, 57a of the ejector mechanism are connected through the valve spool and line 400 to the vacuum line 416, whereupon the ejector mechanism can transport box parts away from the second folding station. The timing of these operations has been described, and is best seen from the timing chart of FIG. 25.

Résumé of operation

The operations performed at the various stations, the mechanism at those stations, and the operation of the various mechanisms themselves, have been individually described in detail, so that the entire operation of the apparatus has been explained. Therefore, the following résumé of operation will be made in general terms, without unnecessarily referring to mechanical details of the various operating elements of the units or mechanisms at the various stations.

In the description of the sequence of operation that follows, a single blank will be followed through the machine, and reference will be made to the timing diagram of FIG. 25 relative to that blank. If it is desired to compare the timing of any one of the individual units with respect to any other, such relative timing can be readily obtained directly from the timing diagram of FIG. 25, wherein the positions of all units are referred to degrees of camshaft (K and K1) rotation.

Referring to FIG. 1, the operator of the machine places a previously notched and tabbed blank L in the machine at the registration station A, with the blank resting on extensions 66 of the lower dies, and with the end panels 11 resting on the side guides 68. The trailing side panel 12 is now in position to be picked up by the pushers 109 of the feed carriages 91. When the blank is in place at the registration station, the carriages 91, which have a dwell period in their upper, retracted position, start forward, and pusher fingers 109 move the blank from the registration station A, along the side guides and lower die extensions, to the first fold station B. The stroke of the feed mechanism is constant, and since the length of the longitudinal dies at the first fold station exceeds that of the maximum width blank that will be formed in the machine, the position of the blank at the first folding station B is not critical.

When the blank reaches the first folding station B, the pusher elevator permits the feed carriages 91 to move down, and soon thereafter, the longitudinal upper dies U at the first folding station start down toward the lower dies D. Before the upper dies U are fully down, the feed carriages 91 will be fully down, and will have started retracting toward their initial, or forward position. The dies U and D at the first folding station complete their fold soon after the lower feed carriages 91 begin their retract stroke, and the upper dies U remain down for some time, so that the heaters 153 in the lower dies D (FIG. 6), can soften and mold the blank material, to form good corners at end panels 11.

After the feed carriages 91 have fully retracted to their starting position, the elevator mechanism for the feed carriages lifts them and returns them to their upper position illustrated in FIG. 1. The blank L1 (FIG. 1) has now been formed at the first folding station B, with the longitudinally extending end panels 11 and their associated tabs 13 folded down against the longitudinally extending lower dies D.

Feed carriages 91 are now advanced as before, except on this stroke, the blank being traced through the machine (which is now blank L1 as seen in FIG. 1), is advanced by the rearward pusher fingers 110 at the leading ends of the feed carriages 91. This second reciprocation of the feed mechanism slides the blank L1 along the lower dies D, across the inboard tuck plates 186 (FIG. 4) which will be raised, across the inboard anvils 14 and inboard lower die D1, along the side plates 204 mounted between the anvils 14 and 14a, over the anvils 14a and the outboard lower die D2, along the outboard tuck plates 186a (FIG. 4), and against the end stops 314 (FIG. 11). The position of the feed carriages will have been adjusted by screw 108, FIG. 4, so that fingers 110 stop short of the inboard lower dies D1 by a distance equal to the width of the trailing side panel 12.

Near the end of the feeding operation of the blank L1 from the first folding station B, to the second folding station C, first the outboard upper die U2, and then the inboard upper die U1, start their downward stroke. First, the outboard, and then the inboard tuck plates also start to retract, to clear the lateral flaps 12 for folding. Soon after completion of the forward feed stroke, the outboard lateral upper die U2 reaches its partially lowered, or grip position at the lower die D2, but die U2 does not bend down the outboard side panel 12 at this time. The inboard die U1 does the same, but is timed a few degrees later. Both dies U2 and U1 merely grip the blank against the lower dies D2 and D1, while the corner assemblies P and P1 advance.

The panel gripping, solvent application and tab bending cycle illustrated in FIGS. 16 and 18 and previously described now take place, and the description of these operations will not be repeated. The leading side panels 12 are now folded down by die U2. The outboard tuck plates 186a (FIGS. 4 and 11) will have been retracted fully, so that upper die U2 can complete its downward stroke to fold down side panel 12. The outboard tuck plates are now raised to press the margins of leading side panel 12 against the solvent coated tabs 13 (FIG. 19). The outboard tuck plates 186a now retract slightly, to clear the completed box part for lifting by the elevator vacuum cups 15.

The cycle for the inboard tuck plates, upper die U1, and the corner assemblies P is like that just described, but occurs a little later, as indicated in the timing chart. At each corner, the combination of heated anvils, an undisturbed coat of solvent on the tabs, and tuck plate pressure, insures clean, square corners and a good seal. Since the blank is first gripped by the outboard die set U2, D2, and then by the inboard die set U1, D1, any creeping of the material during the gripping operation that might take place, takes place freely, and the blank is neither stretched nor distorted.

Furthermore, though the blank is gripped by the inboard die set U1, D1, during folding operation of the outboard die set U2, D2, only one fold and bead are made at a time, and distortion or stretching of the blank material is further minimized.

The inboard and outboard tuck plates, which were in blank guiding position during the feeding operation, will have been fully retracted to clear the side panels 12 on both sides of the box lid during the folding operation.

However, as described above, these plates are advanced or raised again to form the corner seal. As mentioned, when both the inboard and outboard sealing heads P and P1 have retracted sufficiently to clear the completed box lid, the tuck plates are retracted slightly to clear the box lids. The tuck plates remain in their partially retracted position, to serve as supports during feeding of the next blank. After the tuck plates have retracted slightly to clear the work as described above, upper dies U1 and U2 are raised, and the elevator vacuum cups 15, which will have descended to grip the blank under action of spring 59a (FIG. 22), will be raised by cam 58 to lift the completed box part L2 (FIG. 1) to its elevated position, clear of the dies at the second folding station.

As the elevator cups 15 are lifting the completed box part L2 to its upper position, the carrier 374 (FIGS. 22 and 23) of the ejector mechanism E is completing its forward, or pickup stroke, under the force of springs 63a (FIG. 22). When the elevators are fully raised, the vacuum cups 57, 57a of the ejector E are over the box part, which vacuum is transferred to the ejector vacuum cups, with which vacuum to the elevator cups is released. Cam 61 (FIG. 22) arm 62, and cable 63 now pull the ejector carriage 374 and completed box rearwardly, against the force of springs 63a. The cam stops the rearward or ejecting motion of the ejector carriage 374, and its vacuum cups 57, 57a, when the completed box part is over the side rails 15a. The vacuum to the ejector vacuum cups is released, and the box drops gently onto the discharge rails. Spring 398 at the forward vacuum cup 57a (FIG. 23) assists in providing a positive, yet gentle release of the completed box part.

The adjustment of the apparatus for box length width, and panel depth is essentially like that of the apparatus described in detail in the copending application of Crathern et al., and will not be described here. There is one adjustment not present in the earlier machine, namely, adjusting the height of the solvent drip bottle 270 (FIG. 20), to vary the static head on the solvent as supplied to plungers 214, 214a, in accordance with the depth of the box.

This completes the brief résumé of the cycle of operation referring to a single blank as it moves through the machine. As previously mentioned, the timing diagram of FIG. 25 also shows the relationship between operations occurring at any given station, it being understood that normally two blanks are being folded substantially simultaneously. The various degree of overlapping in the operation at the various stations, can best be understood from direct examination of the timing diagram of FIG. 25.

As previously mentioned, reference to panels 12 as being the "side" panels of the box part, and to panels 11 which carry the tabs 13 as being the "end" panels, is purely arbitrary. These terms are used in this manner solely to clarify the description, and to distinguish between the tab bearing and the non-tab bearing panels.

Having completed a detailed description of the invention, it can be seen that the apparatus of the invention is capable of manufacturing box components from material that is easily marred and is distortable, namely, a thermoplastic, transparent or translucent material such as cellulose acetate, or the like. The apparatus will nevertheless produce perfectly formed and true finished parts, without marring or scratching. The corners will be square, and corners with inside tabs are formed. The solvent system is simple, requires no scavenging, and uses a minimum of solvent. The box parts are fed straight through the machine, which is capable of maintaining a high production rate, and requires but a single operator who need only supply blanks to the registration station. As to production rate, the machine of the present invention readily produces 1600 6" x 6" x 1" box lids or bottoms an hour.

The invention having thus been described, that which is claimed to be new and which is desired to be protected by Letters Patent is:

1. Straight line apparatus for forming box parts from corner notched blanks of sheet material, which blanks provide a main panel, a pair of side panels, a pair of end panels, and sealing tabs on one of said pairs of panels, said apparatus comprising a blank registration station, first and second folding stations, longitudinally reciprocable feed means for advancing blanks from station to station, and means for removing completed boxes from said second folding station; said first folding station including laterally spaced, longitudinally extending die sets for folding the end panels, said second folding station including longitudinally spaced, laterally extending die sets for folding the side panels, sealing means at said second folding station for joining the tabs and opposed pair of panels, said box removing means including longitudinally reciprocable vacuum cup ejector means for transporting completed box parts longitudinally and clear of said second folding station and vertically reciprocable vacuum cup elevator means for engaging the box parts as completed at said second folding station, and for lifting the completed box parts to bring the main panels thereof against the vacuum cups of said ejector means.

2. Apparatus for forming box parts having inside tabs from corner notched blanks of thermoplastic sheet material, which blanks provide a main panel, a pair of side panels, a pair of end panels, and sealing tabs on said end panels; said apparatus comprising a blank registration station, first and second folding stations, longitudinally reciprocable feed means for advancing blanks from station to station, and means for removing completed boxes from said second folding station; laterally spaced, longitudinally extending die sets at said first folding station for folding the end panels and associated tabs, longitudinally spaced, laterally extending die sets at said second folding station for folding the side panels, corner forming and sealing means at said second folding station, said corner forming means each comprising a corner anvil, a gripper for pressing the margin of the end panel against the corner anvil, a plunger having a solvent applicator for applying solvent to the tab upon initial advance of the plunger, additional advance of the plunger trapping the tab between the plunger and the anvil to bend the tab 90°, means for thereafter operating said laterally extending die sets to fold the side panels so as to bring their margins against the solvent coated tabs, and means for pressing the margins of the side panels against the tabs to effect a seal.

3. Apparatus for forming box parts from corner notched blanks of sheet plastic material, which blanks provide a main panel, a pair of side panels, a pair of end panels, and sealing tabs on one of said pairs of panels, said apparatus comprising a blank registration station, first and second folding stations, longitudinally reciprocable feed means for advancing blanks from station to station, and means for removing completed boxes from said second folding station; said first folding station including laterally spaced, longitudinally extending fixed and movable die sets for folding the end panels, said second folding station including longitudinally spaced, laterally extending fixed and movable die sets for folding the side panels, means for causing the movable dies at said second folding station to grip the blank against the fixed dies without folding the panels, plungers at said second folding station for applying solvent to the tabs and for thereafter bending the tabs, means for thereafter causing said movable dies at the second folding station to fold the panels which they have been gripping against the solvent coated tabs, and means for pressing the margins of the panels against the tabs to effect the corner seals, with the tabs being on the inside of the panels.

4. The apparatus of claim 3, wherein said movable dies at the second folding station grip and fold their associated panels sequentially.

5. In a plastic box part making machine, apparatus for sealing side panels folded from the main panel of a plastic blank against tabs carried by end panels folded from the main panel, said apparatus comprising anvil means at each corner of the box part, a combined solvent applicator and tab folder plunger at each anvil means, each plunger being reciprocably mounted to clear the associated anvil means by approximately the thickness of the box part material, each plunger having a porous solvent applicator strip projecting a short distance past the forward face of the plunger for engaging and supplying solvent to the associated tab upon initial advance of the plunger, continued advance of said plunger causing the corner of the plunger adjacent the associated anvil means to engage and fold the associated end while trapping the tab between the side of the plunger and said anvil means, and means for supplying plastic material solvent to said plunger applicator strip.

6. The apparatus of claim 5, wherein the angle between the forward face of said plunger and the side of the plunger that is adjacent the associated anvil means, is slightly greater than 90°.

7. The apparatus of claim 5, wherein said porous strip is vertical, and is formed of sintered metal, with the density of the porous strip increasing substantially uniformly from top to bottom.

8. The apparatus of claim 7, wherein said means for supplying solvent to each porous strip includes a drip bottle assembly for maintaining a constant static head of solvent, and means for connecting staid drip bottle assembly to the upper portion of said porous strip.

9. The apparatus of claim 7, wherein an individual drip bottle assembly is provided for each plunger and porous strip assembly, and wherein each drip bottle assembly is vertically adjustable, for varying the static head on the porous strips individually.

10. In a machine for making plastic box parts, a frame, an anvil on said frame having corner faces for backing up the blank corner, a corner assembly comprising a gripper block mounted on said frame for motion toward and away from one corner face of said anvil for pressing the margin of a blank panel against said one face of the anvil, a plunger slidably mounted in said gripper block, said plunger having solvent applicator means at the forward face thereof for applying solvent to a tab projecting from the blank panel, said plunger having a side face that clears the other corner face of said anvil by the thickness of the tab for trapping the corner portion of the tab and bending the coated tab around said anvil, as the plunger continues to advance after applying solvent to the tab, a spring connected between said plunger and said gripper block for retracting the plunger into the block, and means on said frame for reciprocating said plunger directly, and said gripper block indirectly, through said spring.

11. The apparatus of claim 10, wherein said solvent applicator means is a vertically disposed porous sintered bronze strip that increases progressively in density from the top to the bottom of the strip, and means for supplying plastic material solvent to the upper portion of the strip.

12. A machine for making box parts from blanks of thermoplastic material, the blanks having a main panel, side panels, and end panels having tabs projecting therefrom; said machine having a frame, longitudinally extending first lower dies fixed on said frame, movable upper dies above said lower dies for bending down the end panels of the blanks and their attached tabs; laterally extending second lower dies fixed on said frame, an anvil at the end of each of said second lower dies, said anvils having corner faces for backing up a blank corner, movable upper dies above said second lower dies for bending down the side panels of the blanks; a corner forming assembly at each anvil, each corner assembly comprising a gripper block mounted on said frame for motion toward and away from one corner face of said anvil for pressing the margin of an end panel against said one face of the anvil, a plunger slidably mounted in said gripper block, said plunger having solvent applicator means at the forward face thereof for applying solvent to a tab projecting from the end panel, said plunger having a side face that clears the other corner face of said anvil by the thickness of the tab for trapping the corner portion of the tab and folding the coated tab around said anvil as the plunger continues to advance after applying solvent to the tab, a spring connected between said plunger and said gripper block for retracting the plunger into the block, means on said frame for reciprocating said plunger directly and said gripper block indirectly through said spring; means on said frame for causing the upper dies at said second lower dies to fold down the side panels after the tabs have been folded; tuck plates at each anvil, and means on said frame for raising said tuck plates to press the margins of the side panels against the folded, solvent coated tabs.

13. For use in a machine for making boxes from blanks of sheet thermoplastic material wherein the blanks have a panel and a tab projecting from the panel; a combined plastic material solvent applicator and tab bending assembly comprising a plunger having a forward portion with a generally vertical forward face, a vertically extending groove in said plunger at said face, a solvent applicator strip of sintered porous bronze material set in said plunger groove, said porous strip being of progressively increasing density from the upper to the lower portion thereof, means for conducting solvent to an upper portion of said porous strip, and means for mounting said plunger for horizontal reciprocation in the machine.

14. The assembly of claim 13, wherein a spring retains said plunger in said plunger mounting means, and means are provided for reciprocating said assembly, said reciprocating means being connected directly to said plunger, and indirectly to said plunger mounting means through said spring.

15. The method of forming box parts from plastic material blanks having a main panel, side panels, and end panels with tabs projecting therefrom, comprising the steps of folding the end panels of the blank 90°, gripping the blank adjacent the junction of the side panels and the main panel, applying solvent to the tabs, folding the tabs 90° without engaging their solvent coated areas, folding the side panels of the blank 90°, and pressing the margins of the side panels against the associated solvent coated tabs to effect a seal, with the tabs being on the inside of the side panels in the completed box part.

16. The method of claim 15, wherein the gripping and folding of one side panel precedes the corresponding gripping and folding of the other side panel.

17. The method of claim 15, wherein the tabs are folded by internally backing up the tabs while externally and progressively trapping the backed up tab material adjacent the corner thereof.

18. The method of forming box parts from plastic material blanks having a main panel, side panels, and end panels with tabs projecting therefrom, comprising the steps of folding the end panels of the blank 90°, advancing the partially folded blank in the direction of the extent of resultant end corner, applying plastic material solvent to the tabs, folding the tabs 90°, folding the side panels 90°, pressing the margins of the side panels against the solvent coated tabs to effect a seal, and removing the completed box part.

19. The method of claim 18, wherein the end and side panels are folded downwardly, the blanks are advanced horizontally, and the blanks are removed by first lifting them vertically and then ejecting them horizontally in the same direction that the partially folded blank was advanced.

20. The method of claim 18, wherein the blanks are gripped at the junction of the side panels and the main panel while the operations are being performed on the tabs.

21. The method of claim 20, wherein the blanks are gripped sequentially.

22. The method of claim 20, wherein the blanks are gripped sequentially and wherein the side panels are folded sequentially.

23. A method of folding a tab that projects from the edge of a panel of a plastic box blank comprising the steps of gripping the panel along both faces and up to said edge while leaving the tab freely projecting from the edge, providing a tab back-up face extending substantially 90° from said edge of the panel, initially engaging the tab along a contact line parallel to but spaced outwardly from said edge of the panel by a distance substantially equal to the thickness of the tab, progressively advancing the line of tab engagement in a plane parallel to the tab back-up face, and maintaining pressure on the entire portion of the tab that has been traversed by the advancing line of engagement for pressing said entire tab portion against the back-up face during the folding operation.

References Cited by the Examiner

UNITED STATES PATENTS

| | | | |
|---|---|---|---|
| 1,348,369 | 8/1920 | Morrison | 93—54.2 |
| 2,299,877 | 10/1942 | Calkins | 29—420.5 |
| 2,771,667 | 11/1956 | Sunden | 29—420.5 |
| 2,983,660 | 5/1961 | Loeb et al. | 29—420.5 |
| 3,000,275 | 9/1961 | Semson | 93—51 |
| 3,068,760 | 12/1962 | Gross | 93—49 |
| 3,096,692 | 7/1963 | Crathern et al. | 93—49 |
| 3,096,693 | 7/1963 | Simpson | 93—51 |
| 3,101,654 | 8/1963 | Ullman | 93—49 |

BERNARD STICKNEY, *Primary Examiner.*